(12) United States Patent
Simpson

(10) Patent No.: US 7,213,888 B2
(45) Date of Patent: May 8, 2007

(54) WHEEL SPINNER ASSEMBLY

(75) Inventor: David T. Simpson, Covington, GA (US)

(73) Assignee: Clarence Hall, Conyers, GA (US)

( * ) Notice: Subject to any disclaimer, the term of this patent is extended or adjusted under 35 U.S.C. 154(b) by 0 days.

(21) Appl. No.: 10/817,066

(22) Filed: Apr. 1, 2004

(65) Prior Publication Data
US 2005/0116530 A1 Jun. 2, 2005

Related U.S. Application Data

(60) Provisional application No. 60/525,692, filed on Nov. 28, 2003.

(51) Int. Cl.
B60B 7/04 (2006.01)
B60B 7/00 (2006.01)

(52) U.S. Cl. .............................. 301/37.25; 301/37.108

(58) Field of Classification Search ........... 301/37.101, 301/37.25, 37.26, 37.108, 37.109; 40/587; D12/204, 209, 210, 212
See application file for complete search history.

(56) References Cited

U.S. PATENT DOCUMENTS 2,997,344 A * 8/1961 Whiteman ............... 301/37.25
D219,567 S * 12/1970 Ascani et al. ............ D12/204
D361,975 S * 9/1995 Weld ...................... D12/210
D384,021 S * 9/1997 Hoxie ...................... D12/204
6,517,167 B2 * 2/2003 Baker ..................... 301/37.25
D495,287 S * 8/2004 Wang ...................... D12/209
6,799,810 B1 * 10/2004 Wang ..................... 301/37.25
D497,862 S * 11/2004 Chiu ....................... D12/209
D501,438 S * 2/2005 Chiu ....................... D12/209
D501,439 S * 2/2005 Chiu ....................... D12/209
6,896,334 B1 * 5/2005 Baker ..................... 301/37.25

* cited by examiner

Primary Examiner—Jason R. Bellinger
(74) Attorney, Agent, or Firm—Michael J. Bootcheck, LLC; Michael J. Bootcheck

(57) ABSTRACT

A wheel assembly comprising: (1) a first rotating member, such as a wheel; (2) a visual element such as a logo or other visual indicia affixed to, or mounted adjacent, an exterior surface of the first rotating member; and (3) a second member, such as a wheel spinner, mounted to rotate adjacent the first rotating member. The second member defines various openings and is configured for movement into an "aligned" angular orientation such that the various visual indicia are viewable through the openings thereby producing a themed visual effect.

67 Claims, 16 Drawing Sheets

REVOLVER- CYLINDER THEME

WHEEL SPINNER ASSEMBLY

CROSS-REFERENCE TO RELATED APPLICATIONS

This application claims priority from U.S. provisional application Ser. No. 60/525,692, filed Nov. 28, 2003, which is titled "Wheel Spinner Assembly", and which is hereby incorporated by reference.

BACKGROUND OF THE INVENTION

As the design and basic shape of modern vehicles has grown more uniform due to aerodynamic styles and principles of fuel economy, consumers have become increasingly interested in distinctive or "customized" vehicle accessories. In particular, a significant marketplace has been established for distinctive wheels that are adapted for use on automobiles, trucks, motorcycles, bicycles, and other wheeled vehicles. Accordingly, there is a need for improved and distinctive wheel assemblies.

BRIEF SUMMARY OF THE INVENTION

The present invention is directed to improved wheel spinners, and improved wheel/wheel spinner combinations. In particular, various embodiments of the invention provide an improved wheel/spinner assembly (which may be referred to as one type of "wheel assembly") that provides enhanced visual and functional effects. According to various embodiments of the invention, the improved wheel assembly comprises: (1) a first rotating member, such as a wheel; (2) a visual element such as a logo or other visual indicia mounted adjacent (e.g., affixed to) an exterior surface of the first rotating member; and (3) a second member, such as a wheel spinner, mounted to rotate adjacent the first rotating member. According to one embodiment, the second member is mounted substantially concentrically with the first rotating member. In another embodiment, the first rotating member and the second member are configured to rotate about a central (preferably common) axis of rotation.

According to several embodiments, the second member defines one or more openings having an outer perimeter. The openings are sized to visually frame the one or more visual elements provided adjacent (e.g., attached to) the exterior surface of the first rotating member. Accordingly, when substantially aligned in a home position, the visual elements are readily apparent to an observer viewing the wheeled vehicle. Alternatively, when oriented in a first position in which the first and second members are not substantially aligned, the visual elements are not substantially viewable to an observer, or are partially obstructed from an observer's view.

In several other embodiments, the wheel assembly of the present invention may be a themed wheel assembly. As referenced above, a themed wheel assembly according to one embodiment of the invention includes a first rotating member and one or more visual elements disposed adjacent (e.g., affixed to) the exterior surface of the first rotating member. In one embodiment, the visual elements include a design, logo, or indicia not typically associated with a wheel or rim. For example, the visual elements may include a plurality of bullet indicia, one or more sports logos, playing cards, roulette numerals, or other similar elements. Moreover, the themed wheel assembly according to several embodiments of the invention includes a second member mounted to rotate adjacent the first rotating member. In one embodiment, the second member is configured to complement the theme established by the visual elements, thereby creating a themed visual effect. According to one embodiment, the second member achieves a themed structure by including one or more openings and/or recesses as discussed in further detail below.

As referenced above, in one embodiment, the first rotating member may be a wheel that includes a rim, a mounting area, and a hub or median region disposed therebetween. In one embodiment, a themed wheel assembly includes a plurality of bullet indicia that are adjacent (e.g., formed into or affixed to) the exterior surface of the wheel. In one embodiment, the bullet indicia are configured to resemble the firing end of a bullet. In another embodiment, the bullet indicia are distributed in a substantially uniform radial pattern about the median region of the wheel (e.g., so that the center of at least one, and preferably all, of the various bullet indicia are spaced apart from the center of a neighboring bullet indicia by a pre-determined distance).

In one embodiment, the second member is a wheel spinner having a substantially circular shape. The wheel spinner defines a plurality of substantially circular openings configured to substantially align with one or more corresponding bullet indicia when the wheel spinner is oriented in a home position. Accordingly, in one embodiment of the invention, when the wheel spinner is in this home position, the various bullet ends cooperate with the wheel spinner to produce the visual appearance of a loaded revolver-cylinder. In one embodiment, the themed wheel assembly may include a plurality of (e.g., five or six) bullet indicia and a corresponding plurality of wheel spinner openings that may be aligned with the six bullet indicia to create the appearance of a multi-bullet revolver cartridge. In another embodiment, the wheel spinner may include a plurality of substantially semi-circular recesses that are defined adjacent the outer perimeter of the wheel spinner and that are positioned between adjacent spinner openings to resemble the outer contour of discrete bullet chambers. This further enhances the revolver-like appearance of the wheel assembly.

In various other embodiments, the themed wheel assembly may include several additional themes. For example, a sports theme, such as a baseball theme, may be provided in which the wheel spinner is configured to resemble a baseball or baseball bat. In one embodiment, the ball or bat-shaped wheel spinner includes one or more openings for viewing a plurality of team logos that are provided on the exterior surface of an adjacent wheel. In another embodiment, a stop-motion animation theme may be created. According to this embodiment, the wheel spinner is configured to maintain a fixed radial orientation despite relative rotation of an adjacent wheel. The second member includes an opening for viewing various stop-motion elements provided on the exterior surface of the wheel as described in further detail below. Other similar themes as known to one of ordinary skill in the art (e.g., roulette, poker or playing card themes) may be employed without deviating from the inventive concepts disclosed herein.

In one embodiment, the wheel assembly is comprised essentially as described above, however, the wheel assembly further comprises an aligning mechanism that rotates the second member from a first position in which the openings of the second member are misaligned relative to the visual elements of the first member, to a home position in which the openings of the second member are substantially aligned relative to the visual elements of the first rotating member. In one embodiment, the aligning mechanism includes a first weighted portion affixed to the first rotating member, a second member mounted to rotate adjacent the first rotating member, and a second weighted portion affixed to the second member. The first and second weighted portions are preferably affixed, respectively, to the first rotating member and the second member such that gravity acts to position the weighted portions of the members substantially below their respective rotational axes. Accordingly, the openings and visual elements may be configured to reach a substantially aligned or home position when the first rotating member and the second member are brought substantially to rest.

In other embodiments, the self-aligning mechanism may be an electromagnetic or other similar device for securing the second member in a given orientation relative to the first rotating member. In still another embodiment, a locking mechanism, such as a screw or cap nut may be provided to manually fix the orientation of the second member relative to the first rotating member.

BRIEF DESCRIPTION OF THE DRAWINGS

FIG. 3 is a detail view of a wheel according to one embodiment of the invention, wherein the wheel is installed adjacent the conventional wheel mount depicted in FIG. 2.

DETAILED DESCRIPTION OF THE INVENTION

The present invention now will be described more fully hereinafter with reference to the accompanying drawings, in which some, but not all, embodiments of the invention are shown. Indeed, these inventions may be embodied in many different forms and should not be construed as limited to the embodiments set forth herein. Rather, these embodiments are provided so that the disclosure will satisfy applicable legal requirements. Like numbers refer to like elements throughout.

Figure 1:
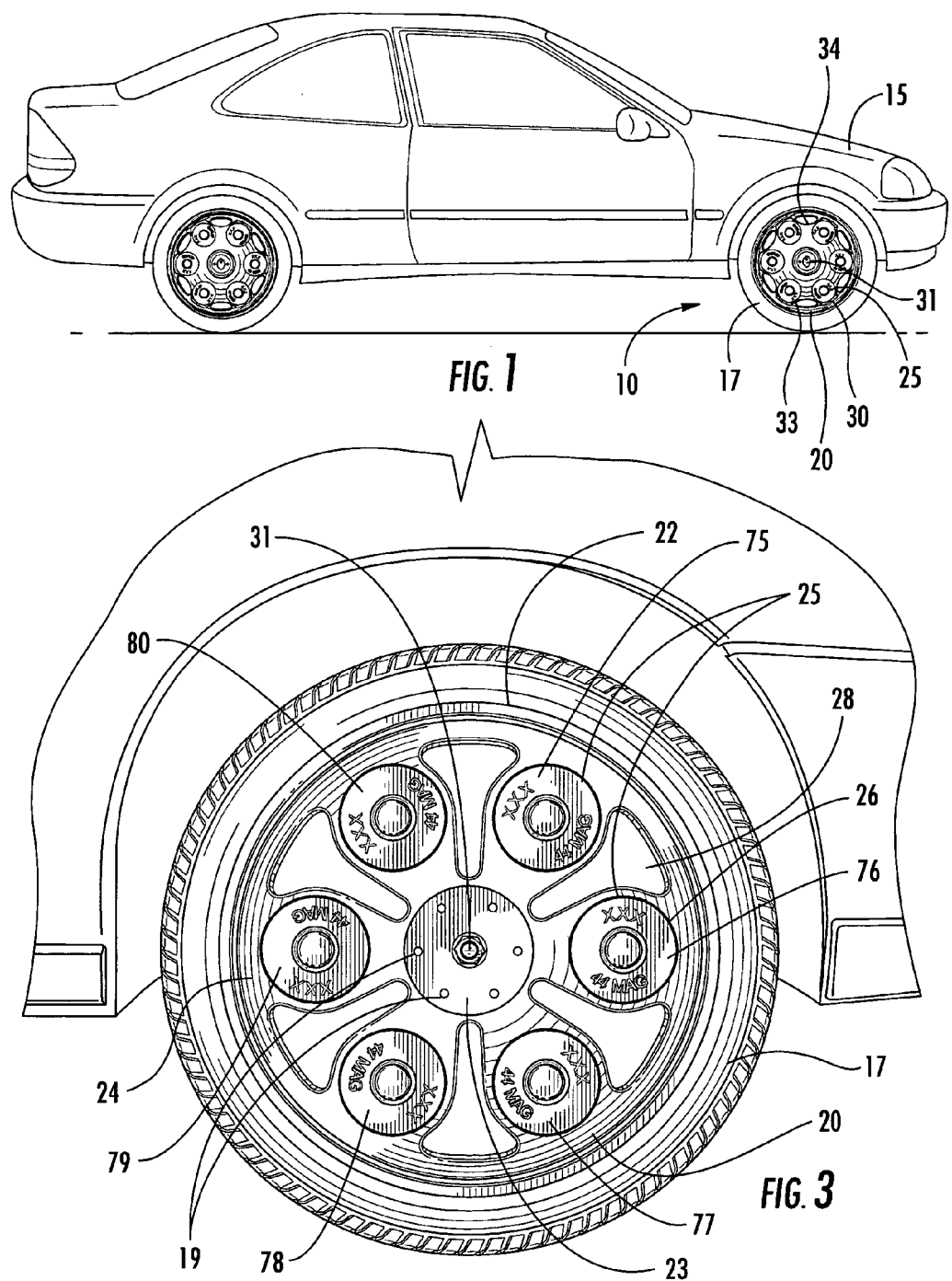
FIG. 1 is a perspective view of a wheel assembly according to one embodiment of the invention, wherein the wheel spinner is rotatably secured to a wheel for supporting an automobile.

FIG. 1 illustrates a wheel assembly 10 according to one embodiment of the invention. In particular, the depicted wheel assembly 10 includes a first rotating member 20, such as a wheel, and a second member 30, such as a wheel spinner, that is provided to enhance the appearance of a wheeled vehicle 15. Although depicted in FIG. 1 as an automotive accessory, it should be noted that wheel assemblies according to the present invention are not limited to automobiles, but instead, may be applied to many other types of wheeled vehicles such as automobiles, motorcycles, trucks, all-terrain vehicles ("ATVs"), bicycles, and the like.

As may be understood from the illustration provided by FIG. 1, the wheel assembly 10 comprises a first rotating member 20 and a second member 30 that is mounted to rotate adjacent the first rotating member 20. According to the depicted embodiment, the first rotating member is a wheel 20 and the second member is a wheel spinner 30. In one embodiment of the invention, the wheel spinner 30 is mounted substantially concentrically with the wheel 20. Both the wheel 20 and the wheel spinner 30 are configured to rotate about a central (preferably common) axis of rotation 31. In one embodiment, the wheel spinner 30 is attached to a bearing (not shown) in a manner known in the art so that the wheel spinner 30 may spin independently of the wheel 20. As discussed in detail below with regard to FIGS. 6 and 7, in other embodiments of the invention, the first rotating member need not be a wheel, and in fact, may be a rotating member positioned between the wheel and the second member. In other embodiments discussed below with regard to FIG. 12, the second member need not be a wheel spinner, and in fact, may be configured to provide stationary (rather than spinning) appearance in use.

Returning to the embodiment illustrated in FIG. 1, the wheel 20 includes one or more visual elements 25 that are disposed adjacent (e.g., affixed to, or are part of) the wheel's exterior face. Each visual element 25 may include, for example, a discrete visual design, logo, indicia, light source, or the like. In another embodiment, the wheel spinner 30 defines one or more openings 33 and/or one or more recesses 34 that are configured to create a themed visual effect when the wheel spinner's openings 33 and/or recesses 34 are in a pre-determined angular orientation relative to the wheel 20. According to several embodiments of the invention, the wheel 20 is comprised of known materials such as aluminum, stainless steel, coated steels and the like.

Figure 2:
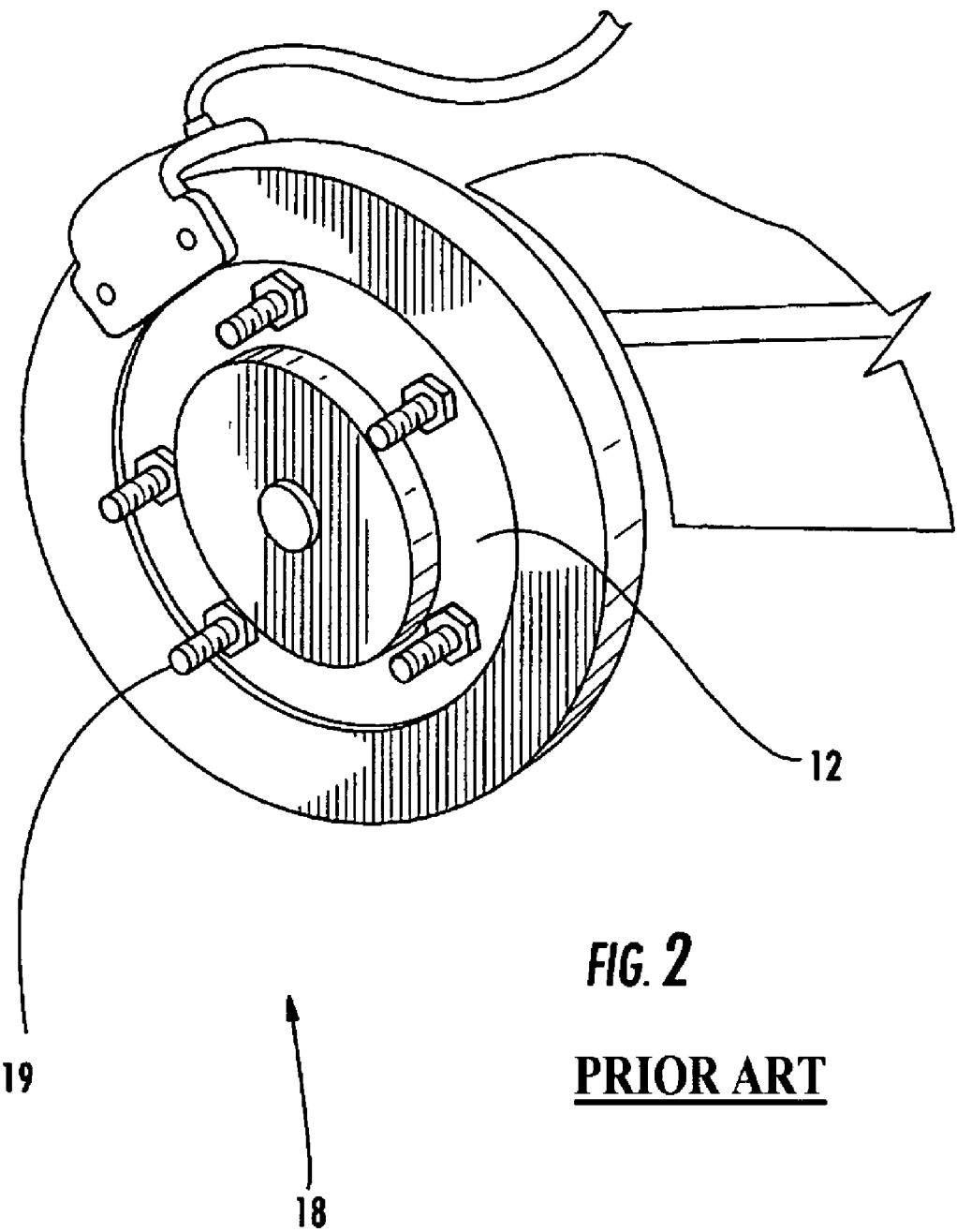
FIG. 2 is a perspective view of a conventional wheel mount as may be provided on an automobile, truck or all-terrain-vehicle.

In one embodiment of the invention, the wheel assembly 10 may be adapted for installation adjacent a conventional vehicle wheel mount 18 of a wheeled vehicle 15. One such conventional wheel mount is shown in FIG. 2. Typically, such wheel mounts 18 include a substantially planar mounting surface 12 having a plurality of radially distributed wheel mount bolts 19 extending therefrom. During operation of the wheeled vehicle (not shown), the wheel mount bolts 19 secure the wheel (not shown) adjacent the planar mounting surface 12. The planar mounting surface 12 may be driven to rotate by the vehicle's transmission or other propulsion system (not shown) or optionally may freely rotate about an axle in non-driven wheels. The wheel mount 18 depicted in FIG. 2 has been provided merely for illustration purposes, and thus, should not be construed as limiting. As known to one of ordinary skill in the art, many additional types of wheel mounts 18 (e.g., truck, motorcycle, A.T.V., and the like) may be readily used to support wheel assemblies in accordance with various embodiments of the present invention.

FIG. 3 illustrates one embodiment of the invention wherein a wheel 20 is positioned (i.e., installed) adjacent the planar mounting surface 12 of a conventional automobile wheel mount 18. Upon installation, the wheel mount bolts 19 extend through opposing holes configured within a central mounting area 23 located on the wheel 20 as shown. The wheel mount bolts 19 are threaded to engage lug nuts (not shown) that are provided to lock the wheel 20 in place during vehicle operation. In addition to the central mounting area 23, the wheel 20 includes a rim 22 for supporting a tire 17 and hub or median region 24 defined between the rim 22 and mounting area 23. Further, it is customary in the art to provide a plurality of weight-reducing areas 28 (e.g., cutouts) distributed about the median region 24 as shown.

As referenced above, in one embodiment, the wheel 20 includes one or more visual elements 25 that are disposed adjacent (and are preferably mounted on, or are integral to) the exterior surface of the median region 24 of the wheel 20 as shown. Each visual element 25 may include, for example, a discrete visual design, a logo, an indicia or one or more light sources. The visual elements 25 provide a themed effect that may be recognizable to an observer. In the depicted embodiment, the visual elements 25 include a first visual element 75, a second visual element 76, a third visual element 77, a fourth visual element 78, a fifth visual element 79, and a sixth visual element 80. In other embodiments, more of fewer visual elements 25 may be provided. For example, in one embodiment, only a single visual element 25 may be disposed within the median region 24.

In one embodiment, the visual elements 25 may be distributed in a uniform fashion at regular angular intervals about the wheel 20. For example, in wheels 20 having six visual elements 25 the elements may be distributed about the wheel 20 at 60 degree intervals along a circle that is substantially concentric with the wheel's axis of rotation. By the same token, in one embodiment having two visual elements 25, the visual elements are spaced apart at 180 degree intervals along a circle that is substantially concentric with the wheel's axis of rotation. Similarly, in one embodiment having four visual elements 25, the visual elements are spaced apart by 90 degree intervals along a circle that is substantially concentric with the wheel's axis of rotation.

In another embodiment, the visual elements 25 are equidistant from the wheel's axis of rotation 31. This ensures proper alignment with substantially uniformly spaced openings provided in a wheel spinner as discussed in detail below. In yet another embodiment, individual visual elements 25 define an outer perimeter or border 26 for further enhancing the element's visual effect. In various embodiments, the visual elements 25 may be painted or include inserts or coatings of various secondary materials (e.g., powder coat, chrome-plate, gold-plate, polymer inserts, and the like) to further enhance the wheel's appearance.

In embodiments having known weight-reducing areas (e.g., cutouts) as referenced above, the visual elements 25 may be distributed radially within the median region 24 adjacent the weight-reducing areas 28. For the purposes of this application, weight-reducing areas 28 include holes, apertures, or openings that are provided in the median regions of wheels to reduce the overall weight of the wheel. In one embodiment, the visual elements 25 are distributed uniformly (i.e., evenly or consistently about the median region of the wheel spinner) in alternating relation to the weight-reducing areas 28 as shown in FIG. 3. In other embodiments, however, two or more visual elements 25 may be provided between two adjacent weight-reducing areas 28.

Figure 4:
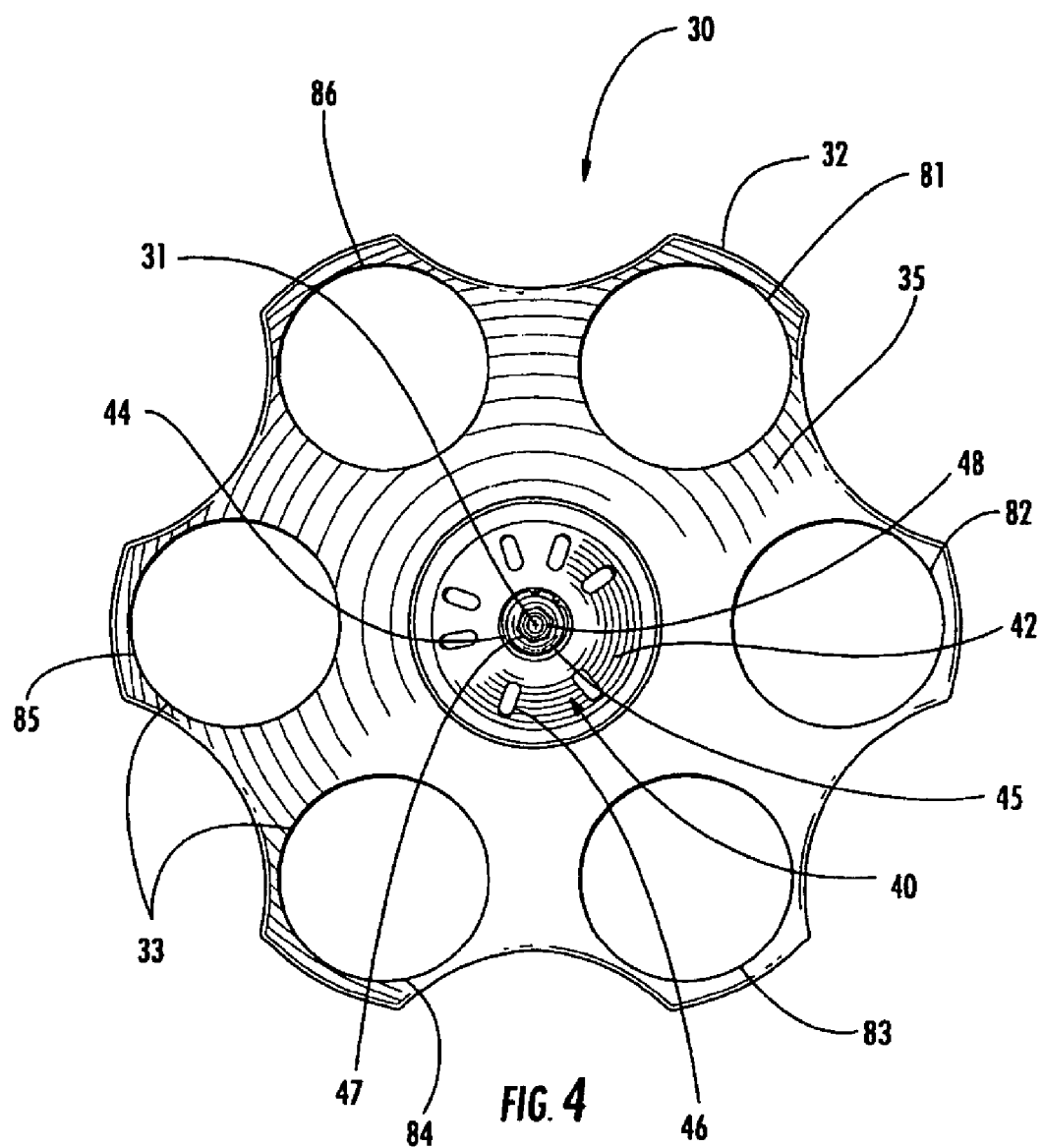
FIG. 4 is a detail view of an inner surface of a wheel spinner according to one embodiment of the invention, wherein the wheel spinner defines a plurality of openings and includes a centrally-disposed bearing assembly.

FIG. 4 illustrates the inner surface of a wheel spinner 30 according to one embodiment of the present invention. According to the depicted embodiment, the wheel spinner 30 is rotatable about an axis of rotation 31 and includes an outer perimeter 32. Although depicted as substantially circular, the wheel spinner 30 in accordance with various other embodiments of the invention may be of any shape (e.g., circular, oval, rectangular, triangular, or any other themed shape as discussed in detail below). A median region 35 is defined between the outer perimeter 32 and the axis of rotation 31. In one embodiment, the wheel spinner 30 defines one or more openings 33 (and preferably a plurality of openings) within the median region 35 that are shaped and configured to complement the shape and distribution pattern of corresponding visual elements 25 on the wheel's exterior face.

Figure 5:
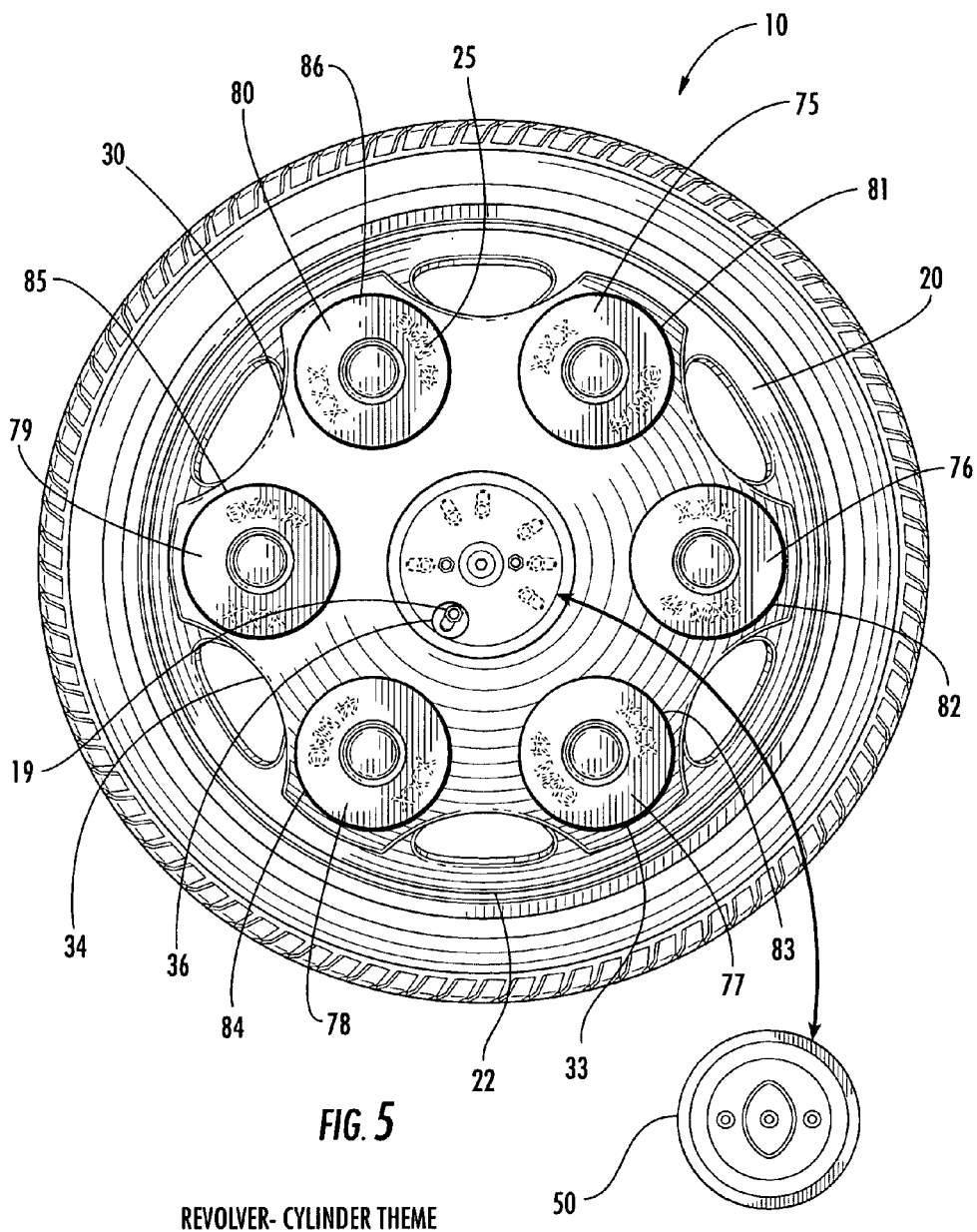
FIG. 5 is a front view of a wheel assembly according to one embodiment of the invention, wherein the wheel spinner is in a "home" rotational orientation.

In the embodiment of the invention shown in FIG. 4, the wheel spinner's openings 33 include a first opening 81, a second opening 82, a third opening 83, a fourth opening 84, a fifth opening 85, and a sixth opening 86. As shown in FIG. 5, these openings 81–86 are configured, respectively, to substantially align with the first through sixth visual elements 75–80 of the wheel 20 discussed above with regard to FIG. 3. The alignment of the wheel spinner's openings 33 and the wheel's visual elements 25 will be discussed in greater detail below.

In one embodiment of the invention, a bearing assembly 40 is provided for rotatably coupling the wheel spinner 30 to the wheel 20. For example, in the embodiment illustrated by FIG. 4, the bearing assembly 40 includes a housing 42 having a centrally-disposed hub 44 for receiving a bearing 45. The bearing 45 is of a type generally known in the art and defines a circular opening 47 for receiving a bearing pin 48 that is coupled at its opposing end to the wheel spinner 30. The bearing pin 48 supports the wheel spinner 30 adjacent the bearing assembly 40 and provides a pivot axis about which the bearing assembly 40 and spinner 30 may rotate. The bearing 45 itself may be comprised of a simple bushing, a race having a plurality of ball-bearings or other similar means as commonly known in the art. In one embodiment, the bearing housing 42 includes a plurality of slots 46 for receiving the various patterns of conventional wheel mount bolts (not shown).

FIG. 5 illustrates an installed wheel assembly 10 in accordance with one embodiment of the present invention. According to several embodiments of the invention, the wheel spinner 30 is installed by inserting the wheel mount bolts 19, extending through the adjacent and previously installed wheel 20, into the slots 46 provided in the bearing housing 42 as shown. Lug nuts (not shown) may then be tightened over the wheel mount bolts 19 to lock the wheel 20 and wheel spinner 30 in place. In one embodiment, one or more access holes 36 are provided through the wheel spinner 30 so that the lug nuts, positioned on wheel mount bolts 19 behind the wheel spinner 30, may be readily accessed even after the wheel spinner 30 has been installed. In one embodiment, a decorative cap 50 may optionally be provided to cover the access hole 36 and other wheel spinner 30 mounting structures (i.e., the bearing pin, washers, and other similar fasteners). In one embodiment, the decorative cap 50 may include a complementary visual element (not shown) adapted to mirror or complement the theme established by the wheel's visual elements 25 as discussed further below.

The wheel spinner 30 is structured and mounted so that the wheel spinner 30 is capable of achieving a pre-determined angular orientation relative to the wheel 20, wherein at least one of (and preferably a plurality of) the wheel spinner's openings 33 substantially align with one (or preferably several) visual element 25 on the wheel 20. In particular, according to several embodiments, the wheel spinner 30 is substantially aligned such that the one or more visual elements 25 of the wheel 20 are substantially centered within the one or more openings 33 defined by the wheel spinner 30. For the purposes of this application, a pre-determined angular orientation wherein the wheel spinner openings 33 are substantially aligned with the wheel visual elements 25 may be referred to as a "home" angular orientation or "home position." Moreover, the overlapping-aligned relationship between the wheel spinner openings 33 and the wheel's visual elements 25 (e.g., as shown in FIG. 5) may be referred herein as a "mirrored" relationship.

As illustrated in FIG. 5, in one embodiment of the invention, when the wheel spinner 30 is in the shown, "home" position relative to the wheel 20, the wheel spinner's first opening 81 aligns with the first visual element 75. Similarly, the second opening 82 aligns with the second visual element 76; the third opening 83 aligns with the third visual element 77; the fourth opening 84 aligns with the fourth visual element 78; the fifth opening 85 aligns with the fifth visual element 79; and the sixth opening 86 aligns with the sixth visual element 80. As referenced above, this embodiment is provided for illustration purposes only. As will be understood from FIG. 5, when the spinner is in other "home" positions, the wheel spinner's first opening 81 may alternatively align with the second, third, fourth, fifth or sixth visual elements 76, 77, 78, 79, 80 of the wheel 20.

According to various embodiments, the wheel assembly of the present invention may be a themed wheel assembly. Similar to the embodiments discussed above, in particular embodiment of the invention, the themed wheel assembly includes a wheel and one or more visual elements disposed adjacent an exterior surface of the wheel. The themed wheel assembly also includes a wheel spinner mounted to rotate adjacent the wheel. In one embodiment, the wheel spinner is configured to create a themed visual effect by defining a series of openings and/or recesses. More particularly, the structure of the wheel spinner is configured to complement the one or more visual elements provided adjacent the exterior surface of the wheel. As will be understood by one skilled in the relevant field, the wheel spinner and wheel may cooperate to produce visual effects having various themes.

For example, FIGS. 1–8 depict a wheel assembly that conveys a revolver-cylinder theme. In particular, FIG. 5 depicts a revolver-cylinder themed wheel assembly 10 comprising a wheel spinner 20 defining six openings 33 and six recesses 34. In addition, six visual elements 25 are disposed adjacent the exterior surface of the wheel 20 (in this embodiment, the visual elements 25 are actually attached to the wheel 20).

In one embodiment, the wheel spinner's openings 33 and the six visual elements 25 are dimensioned and radially positioned so that the wheel spinner 30 may be rotated to a home angular position relative to the wheel 20 (and/or relative to the visual elements 25) as referenced above. In this home position, each of the wheel spinner's openings 33 substantially aligns with a corresponding visual element 25 of the wheel 20 as discussed above. In one embodiment of the invention, the wheel spinner 30 may be moved to a home position, wherein each of the visual elements 25 are substantially centered within a corresponding spinner opening 33 as shown. As will be understood in light of this disclosure, a particular wheel spinner 30 may have a variety of different home positions.

In one embodiment, such as that depicted in FIG. 5, individual visual elements may include a border 26 to emphasize the theme or set-off a visual element 25 from the surrounding wheel 20. In one embodiment, one or more openings 33 defined by the wheel spinner 30 may be configured to substantially concentrically align with one or more of the visual elements 25 when the wheel spinner 30 is positioned in the above-referenced home position. In one embodiment of the invention, when the wheel spinner is in this position, the outer perimeter of at least one (and preferably all) of the openings 33 substantially aligns with the outer perimeter of one of the visual elements 25.

Further, although depicted in FIG. 5 as circular, the visual elements 25 and corresponding wheel spinner openings 33 need not have a circular shape and may in fact be in the form of any suitable shape (e.g., oval, triangle, square).

In other embodiments, the spinner 30 and wheel 20 (including the various visual elements 25) are configured to further enhance their themed appearance or visual effect. For example, in one embodiment, the various openings 33 are spaced substantially uniformly apart (e.g., at regular intervals about the spinner 30) to create the visual appearance of a revolver-cylinder. Furthermore, according to this embodiment, at least one of the visual elements 25 (and preferably all of the visual elements) is configured to resemble the firing end of a bullet (including caliber indicia 56, a manufacturer indicia 52, and a firing pin indicia 54). As a result, the wheel 20 and wheel spinner 30 cooperate to produce the appearance of a loaded revolver chamber. Thus, the wheel 20 and wheel spinner 30 cooperate to produce a revolver-themed appearance.

In other embodiments, optional, uniformly-spaced, semicircular recesses 34 may be circumferentially disposed about the spinner 30 to create a chambered effect, thereby further enhancing the revolver-themed visual effect as shown. In one embodiment, these semicircular recesses 34 may be radially spaced at regular intervals about the perimeter 32 of the wheel spinner 30 as shown. For example, as shown in FIG. 5, in applications having six semicircular recesses 34 the recesses may be provided at 60 degree intervals along the wheel spinner perimeter 32. Further, in another embodiment, such as that depicted in FIG. 5, the individual semicircular recesses 34 may have substantially the same size and shape as adjacent recesses 34 (e.g., one or more, and preferably all, of the recesses 34 may be of substantially the same size and shape). In other embodiments, however, the size and shape of the semicircular recesses 34 may vary between adjacent or alternately adjacent recesses 34 (not shown).

Figure 6A:
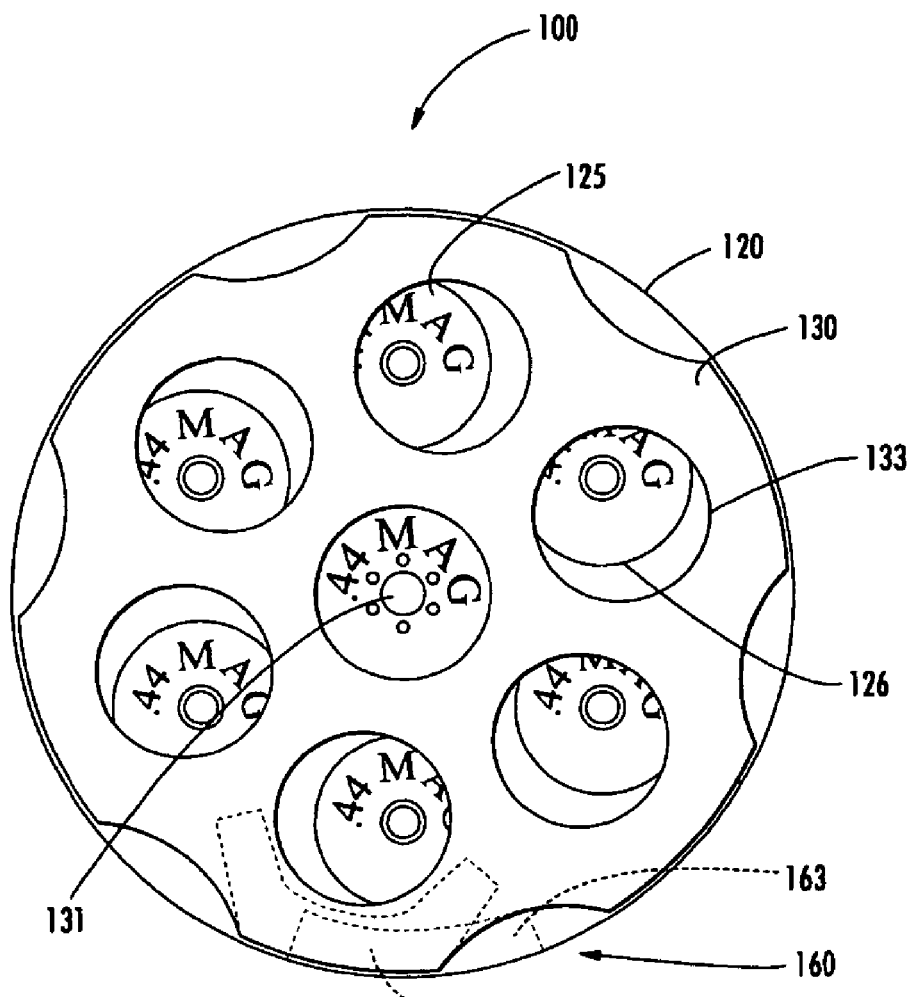
FIG. 6A is a front view of a self-aligning wheel assembly according to one embodiment of the invention, wherein the first rotating member is a substantially circular member that is mounted to rotate between a wheel and a wheel spinner. The depicted self-aligning wheel assembly further includes an aligning mechanism according to one embodiment of the invention.
Figure 6B:
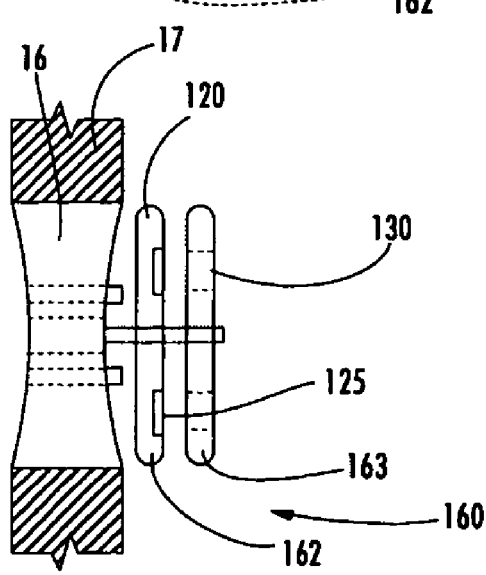
FIG. 6B is a side view of the self-aligning wheel assembly depicted in FIG. 6B.
Figure 7:
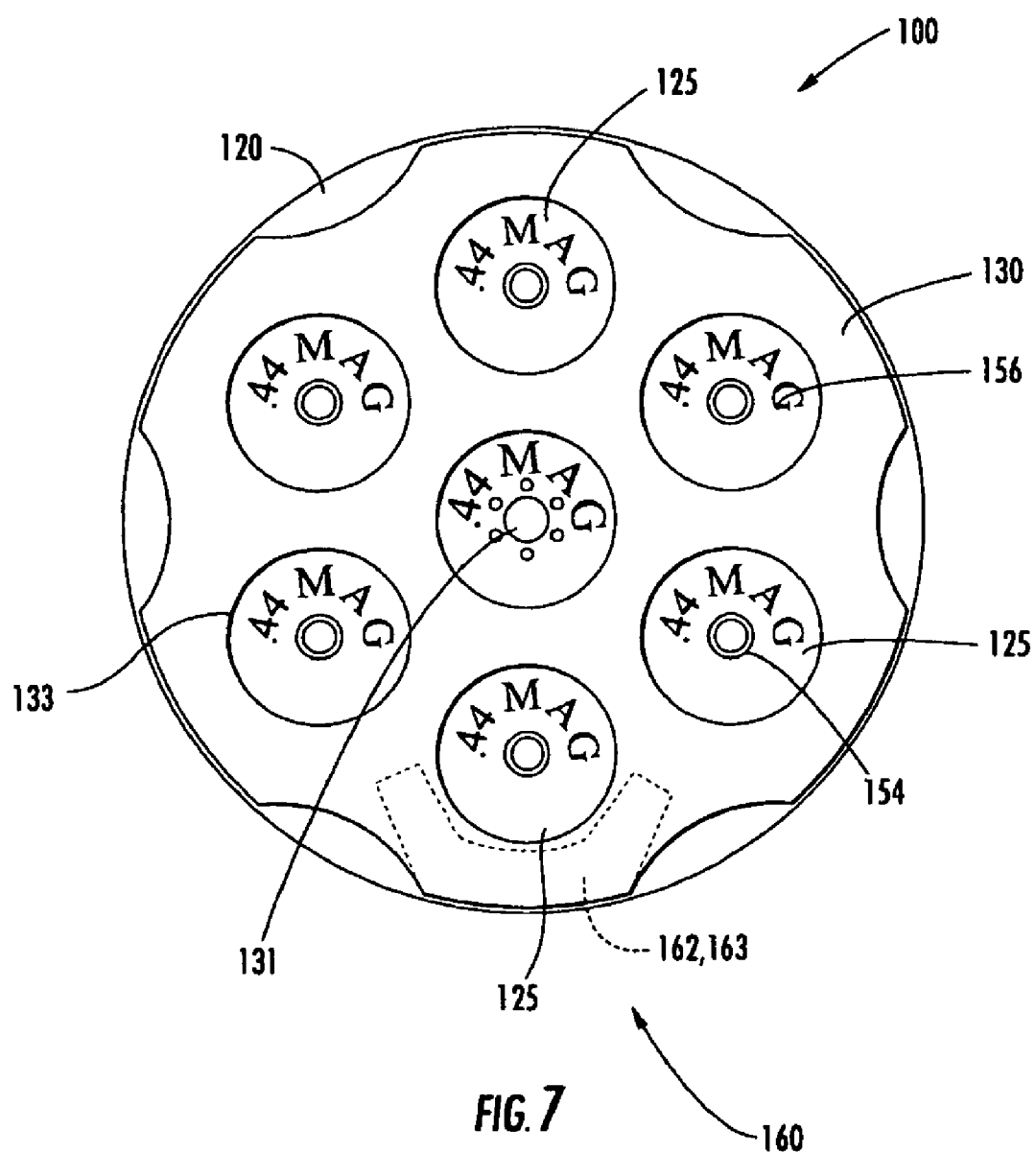
FIG. 7 is a front view of the self-aligning wheel assembly of FIG. 6, wherein the aligning mechanism has returned the self-aligning wheel assembly to a "home" position.

FIGS. 6–8 illustrate the operation of various self-aligning wheel assemblies in accordance with several embodiments of the present invention. Notably, these figures depict wheel assemblies 100, 200 that are constructed in a manner similar to the embodiments of the invention described above. However, the depicted embodiments further comprise aligning mechanisms 160, 260 that are configured to return the second member (e.g., wheel spinner 130, 230) to a particular angular orientation relative to the first rotating member 120, 220.

For example, turning to FIGS. 6 and 7, the aligning mechanism 160, 260 functions to return the self-aligning wheel assembly 100 from a first position (shown in FIG. 6A) in which the wheel spinner openings 133 and visual elements 125 are substantially misaligned, to a "home" position (shown in FIG. 7) wherein the wheel spinner openings 133 and the visual elements 125 are substantially aligned. In one embodiment, the openings 133 and visual elements 125 are substantially aligned when they are substantially concentric. The openings 133 and visual elements 125 are considered to be substantially aligned when their respective perimeters are substantially aligned relative to each other as shown in FIG. 7. The openings 133 and visual elements 125 are considered to be misaligned when their respective perimeters are not substantially aligned relative to each other as shown in FIG. 6A. FIG. 6A also shows outer perimeter or border 126 of individual visual elements 125 and central axis of rotation 131.

As will be understood by one skilled in the art in light of this disclosure, many different types of mechanisms may be used as aligning mechanisms 160. For example, FIGS. 6 and 7 depict a gravitational or weighted aligning mechanism 160 in accordance with one embodiment of the invention. According to this embodiment, a first rotating member 120 (e.g., a planar member) is mounted to rotate adjacent a vehicle. As referenced above, a second member (e.g., a wheel spinner 130) is mounted to rotate adjacent the first rotating member 120 such that the first rotating member 120 is positioned between the second member 130 and a wheel 16, as shown in FIG. 6B.

In one embodiment, the first rotating member 120 and the second member 130 may include first and second weighted portions 162, 163 positioned along one or more outer edges of the first and second members 120, 130. When the forces (e.g., friction transmitted through the bearing from the rotating wheel, wind resistance from a moving vehicle, etc.) are removed that cause the self-aligning wheel assembly 100 to rotate, the first rotating member 120 and the second member 130 gradually stop spinning.

Accordingly, as the first and second members 120, 130 slow below a certain rotational velocity, the first and second members 120, 130 will cease to have the momentum to make a full revolution. Eventually, gravity causes the respective weighted portions 162, 163 to settle substantially below the common axis of rotation 131 of the first and second members 120, 130. In one embodiment of the invention, as shown in FIG. 7, the position of the respective weighted portions 162, 163 may be indexed relative to one another such, when the first rotating member 120 and the second member 130 are at rest, the first and second members 120, 130 is oriented in a substantially aligned or home position at rest.

Figure 8A:
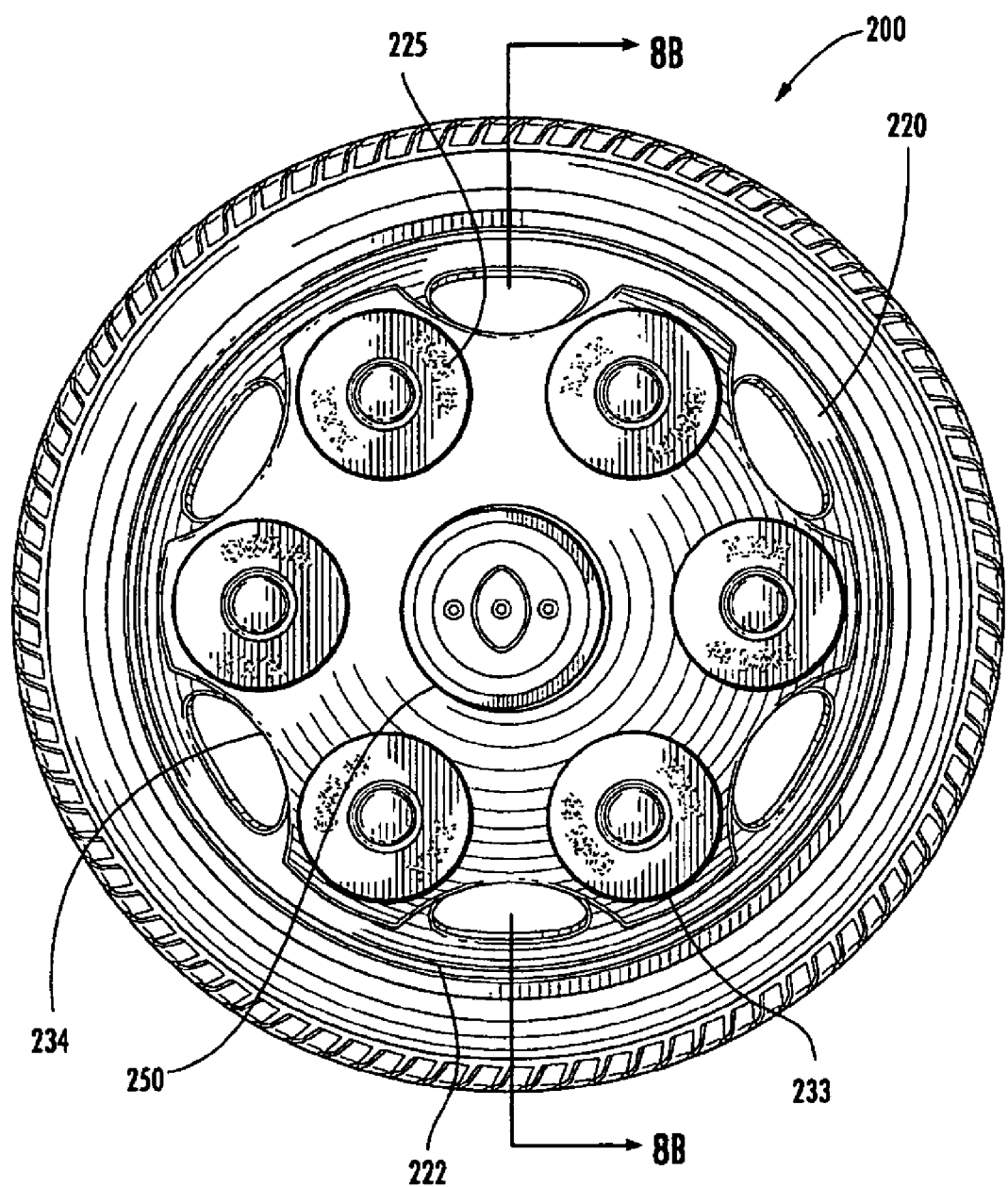
FIG. 8A is a front view of the self-aligning wheel assembly in accordance with one embodiment, wherein the self-aligning wheel assembly comprises an electromagnetic aligning mechanism.
Figure 8B:
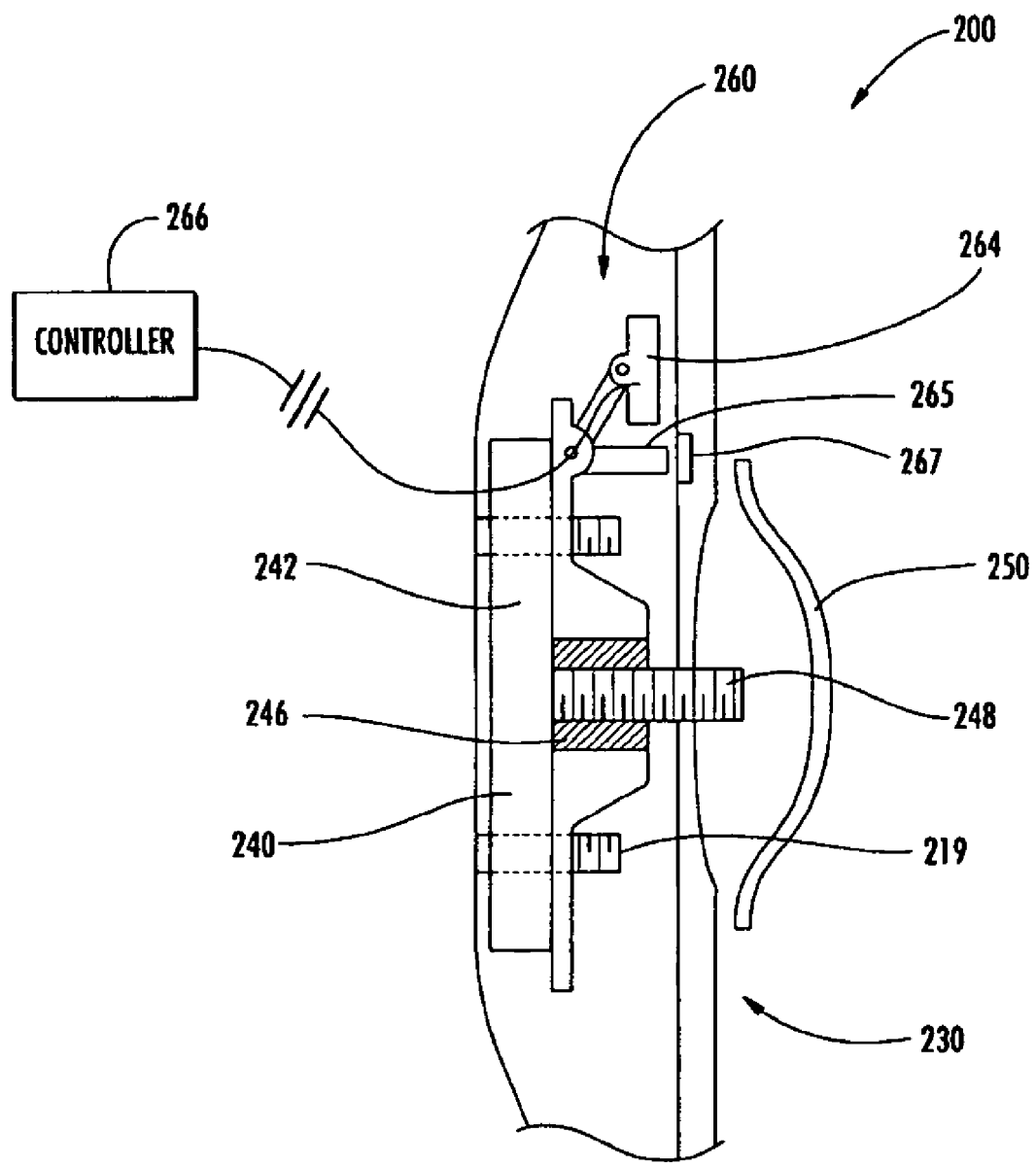
FIG. 8B is a section view of the self-aligning wheel assembly of FIG. 8A, taken along section line 8B—8B.

FIGS. 8A–8B illustrate yet another embodiment of the invention wherein the aligning mechanism 260 is triggered to substantially align the self-aligning wheel assembly 200 in response to a pre-determined condition. For example, in the depicted embodiment the aligning mechanism 260 includes an electromagnet 264, an optical or other similar sensor 265 and a controller 266. These components are configured for communication between one another by electrical, wireless, or other similar means. In one embodiment, an indexing mark 267 or other similar locator is provided on the interior surface of the wheel spinner 230 as shown. Thus, in a manner that will be understood by one of ordinary skill in the art in light of this disclosure, the controller 266 can monitor the position of the indexing mark 267 via the sensor 265 and thereby derive the rotational velocity and relative position of the wheel spinner 230. FIG. 8A also shows rim 222, visual elements 225, recesses 234, and decorative cap 250. FIG. 8B also illustrates vehicle wheel mount bolts 219, bearing assembly 240, bearing housing 242, slots 246, and bearing pin or screw 248.

By correlating this information with the relative position of the wheel spinner openings 233 and the time necessary to signal and engage the electromagnet 264, the controller 266 can substantially align the wheel spinner 230 in a home position as shown in FIG. 8A. Specifically, as the indexing mark 267 rotates to a known position that corresponds to a known wheel spinner 230 orientation (i.e., home angular orientation), the controller 266 may simply signal the electromagnet 264 to engage, and thus, stop the wheel spinner 230 in the desired location (i.e., the home position).

According to one embodiment, the controller 266 may trigger this alignment in response to manual or automatic stimuli. For example, a passenger could manually signal the controller 266 to align the wheel spinner 230 in the home position via an electronic switch or other similar means (not shown). Alternatively, the controller 266 may automatically align the wheel spinner 230 in response to various measured criteria, such as, the rotational speed of the wheel 220. According to this embodiment, the controller 266 aligns the wheel spinner 230 when the speed of the wheel 220 falls below a predetermined rotational velocity (e.g., when the wheel or wheel spinner substantially stops spinning).

Self-aligning mechanisms 260 as described above may create an interesting visual effect for observers viewing the wheel assembly 200 and also could potentially serve to reduce any undesirable consequences of the wheel spinner 230 spinning while the wheel 220 (and the vehicle on which the wheel and wheel spinner are mounted) are stopped. Although depicted as employing an electromagnet 264, it is important to note that the aligning mechanism 260 of the present invention need not be magnetic, and in fact, could comprise various other types of mechanical braking systems known in the art.

A wheel spinner according to a further embodiment of the invention is configured to be selectively moved between a locked and an unlocked configuration. More particularly, as illustrated in FIGS. 9–10, several embodiments of the invention include a selectively-locking wheel assembly 300, 400 having a locking mechanism 370, 470 for selectively substantially preventing or restricting the rotation of the wheel spinner 330, 430 relative to the wheel 320, 420. According to various embodiments of the invention, the locking mechanism 370, 470 is moved into a locked position, wherein the locking mechanism 370, 470 serves to substantially restrict, and to preferably prevent, the spinner 330, 430 from rotating relative to the wheel 320, 420. Thus, as the wheel 320, 420 is rotated during use, the spinner 330, 430 rotates in unison with the wheel 320, 420. Moreover, when the locking mechanism 370, 470 is moved into an unlocked position, the spinner locking mechanism 370, 470 preferably does not substantially restrict the spinner 330, 430 from rotating relative to the wheel 320, 420.

Figure 9A:
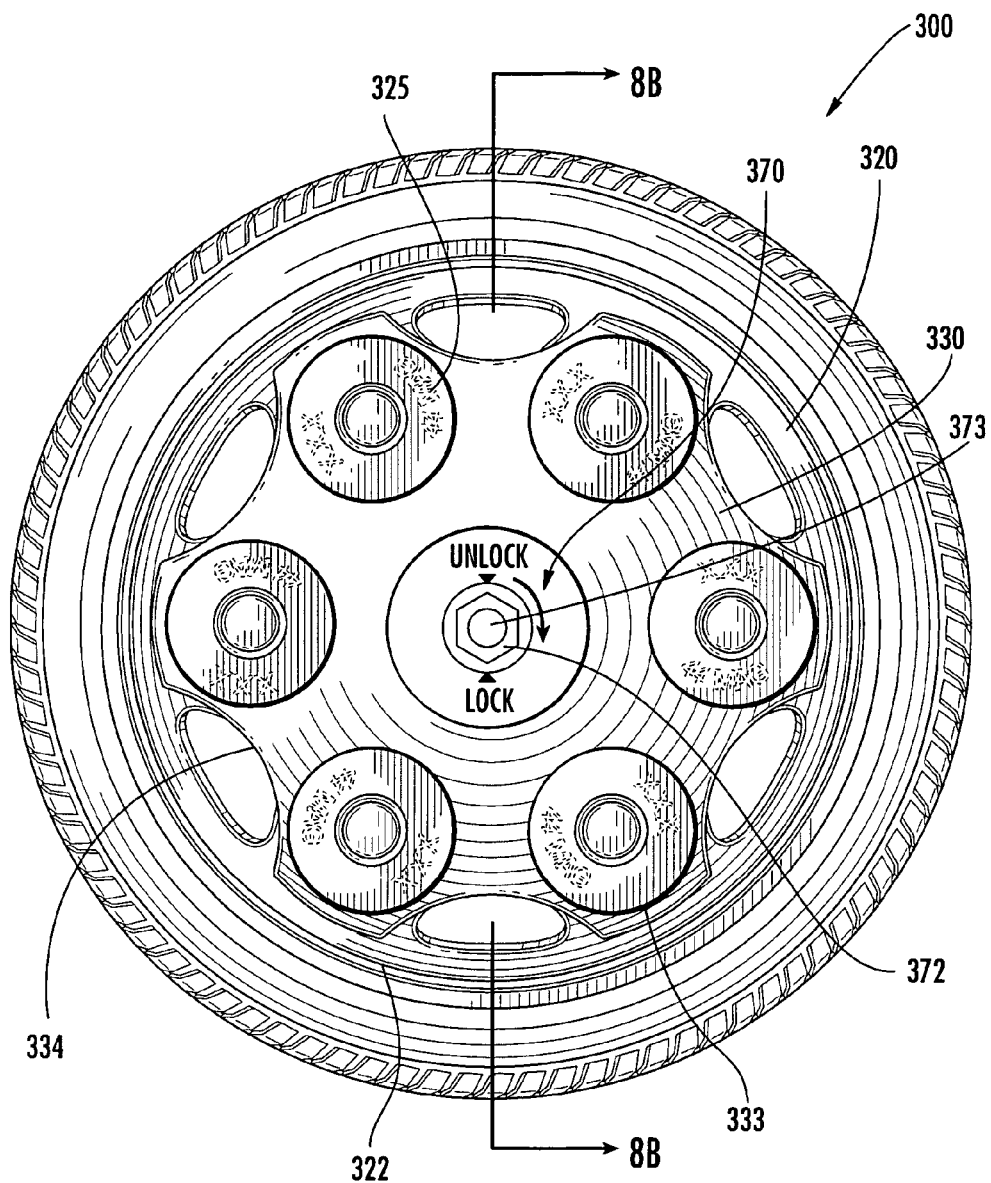
FIG. 9A is a front view of a selectively-locking wheel assembly in accordance with one embodiment, wherein the selectively-locking wheel assembly comprises a screw-type locking mechanism.
Figure 9B:
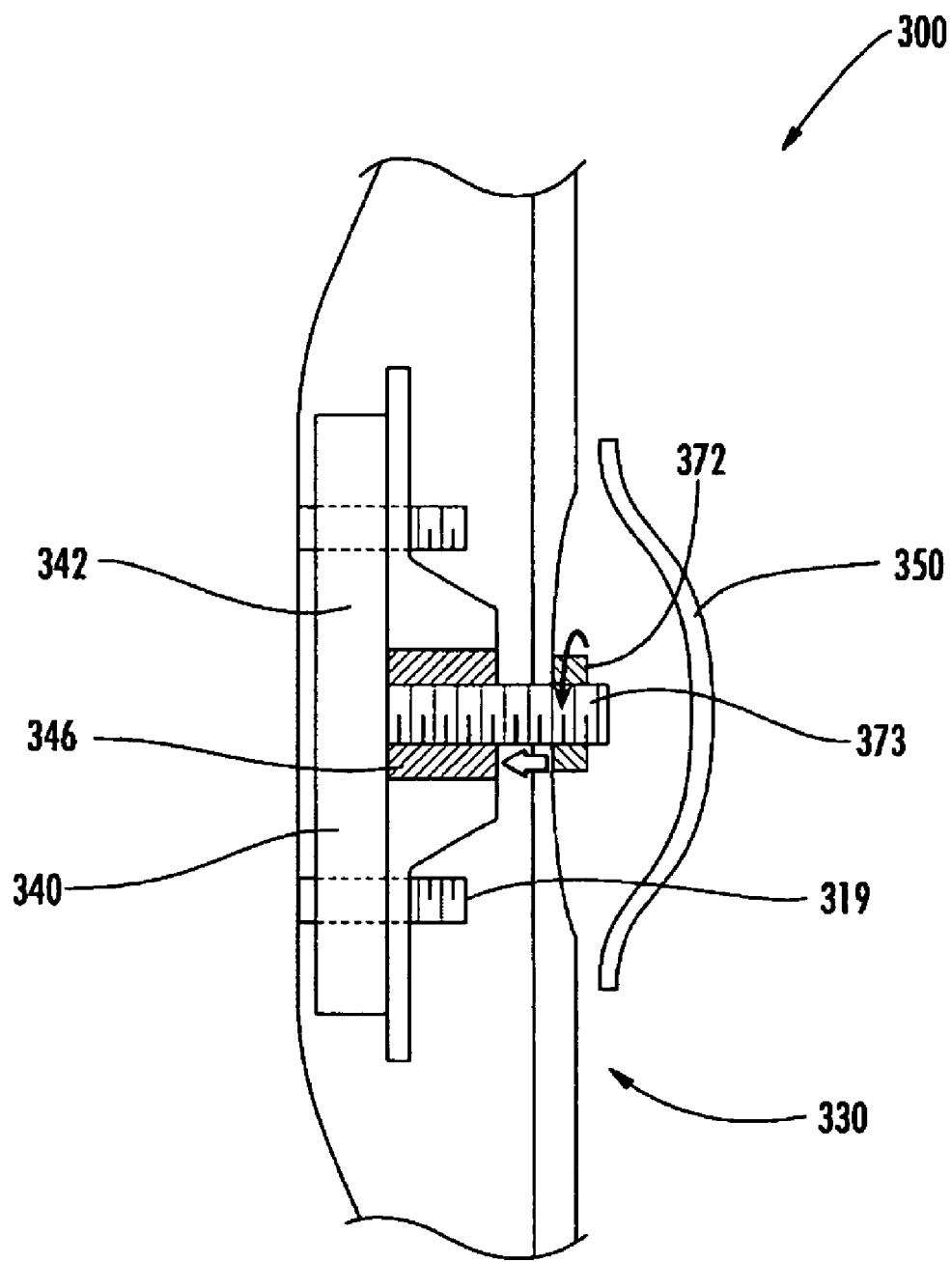
FIG. 9B is a detailed section view of the selectively-locking wheel assembly of FIG. 9A, taken along section lines 9B—9B.

FIGS. 9A–9B illustrate one embodiment of the invention wherein the locking mechanism 370 is configured to allow a user to lock the locking mechanism 370 into one or more specific angular orientations relative to the wheel 320. This prevents the wheel spinner 330 from rotating relative to the wheel 320, thereby maintaining the spinner 330 in a particular orientation relative to the wheel 320. Accordingly, a desired, a constant visual effect may be created by the combination of the wheel 320 and the locked spinner 330. For example, in one embodiment of the invention, the locking mechanism 370 may be configured to allow a user to lock the wheel spinner in the "home" position shown in FIG. 9A.

As will be understood by one skilled in the art in light of this disclosure, many different mechanisms may be used to lock the spinner 330 in place relative to the wheel 320. For example, as illustrated in FIG. 9A, a selectively-locking wheel assembly 300 is depicted comprising a wheel spinner 330, a bearing assembly 340, and a screw 373 or other similar fastener for selectively coupling the wheel spinner 330 to the bearing assembly 340. As is apparent from the detail illustration provided by FIG. 9B, the bearing assembly 340 is constructed and mounted to a vehicle's wheel mount bolts 319 as described above. FIG. 9A also illustrates rim 322, openings 333, and recesses 334. FIG. 9B also illustrates bearing housing 342, slots 346, decorative cap 350 and aligning mechanism 360.

According to the depicted embodiment, the locking mechanism 370 is configured to be moved between locked and unlocked positions and includes a screw 373 and nut 372 assembly. The screw 373 is provided to extend through the axis of rotation of both the wheel spinner 330 and bearing assembly 340. The nut 372 receives the screw 373 and may be selectively tightened or loosened to allow or prevent, respectively, the wheel spinner 330 from rotating relative to the bearing assembly 340 (and attached wheel 320). Further, the nut 372 may be selectively tightened or loosened to apply selective amounts of friction to the wheel spinner 330 and thereby regulate the rotational speed of the wheel spinner 330 relative to the bearing assembly 340 (and attached wheel 320).

Figure 10A:
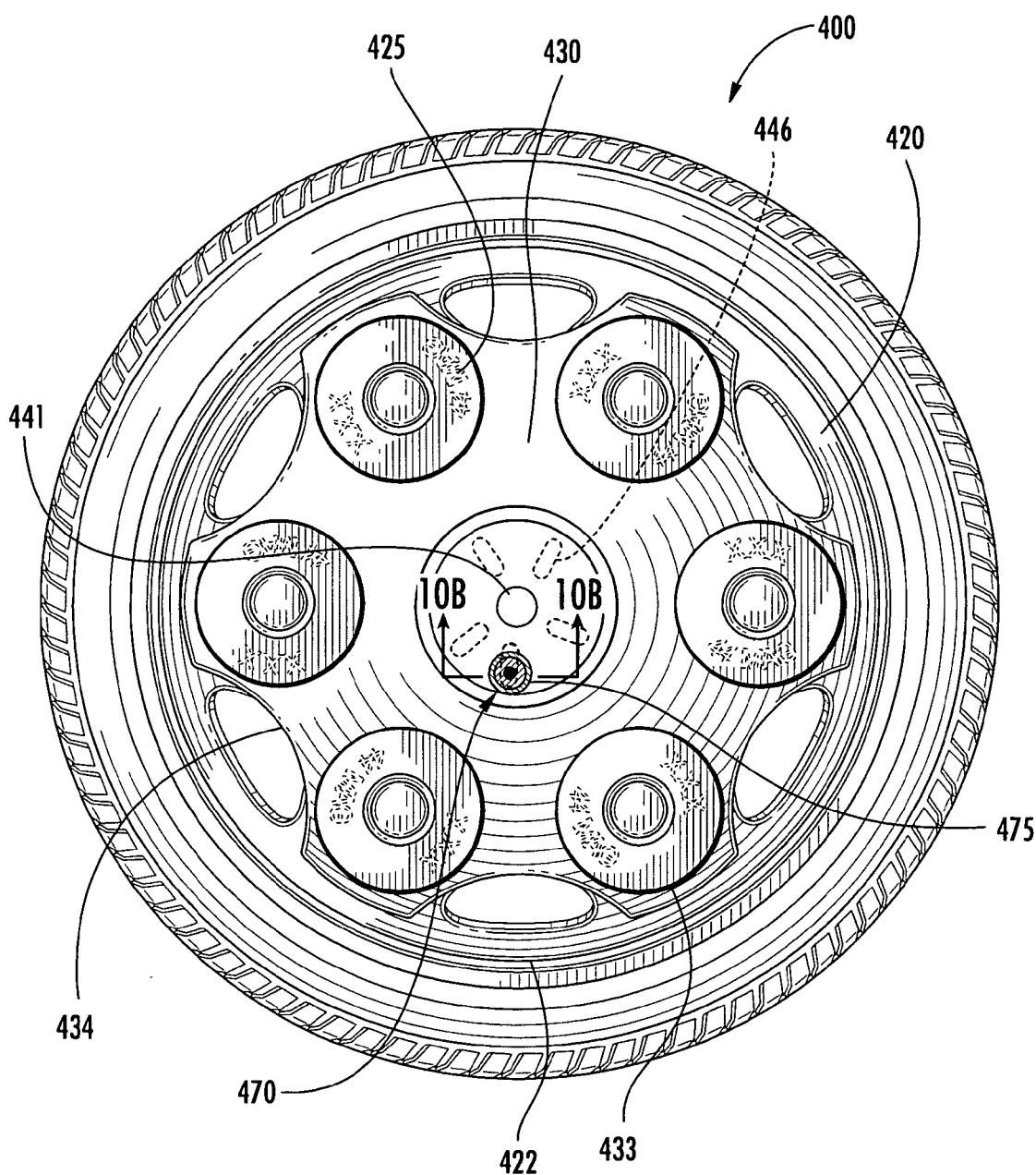
FIG. 10A is a front view of a selectively-locking wheel assembly having a cap-lock mechanism according to one embodiment of the invention.
Figure 10B:
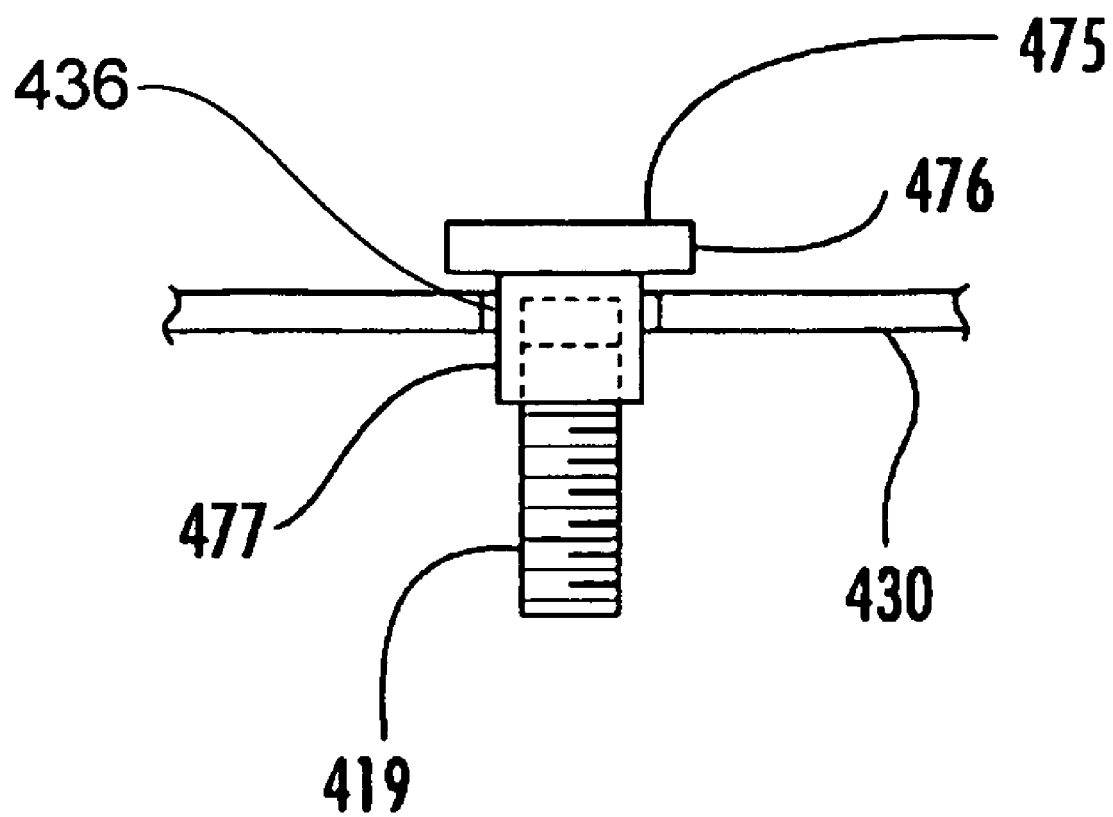
FIG. 10B is a side detail view of the selectively-locking wheel assembly depicted in FIG. 10A, taken along section lines 10B—10B.

FIGS. 10A and 10B illustrate a selectively-locking wheel assembly 400 in accordance with yet another embodiment of the present invention. In particular, FIG. 10A illustrates a front view of a selectively-locking wheel assembly 400 according to one embodiment wherein a wheel spinner 430 and a wheel 420 having various visual elements 425 disposed thereon are constructed as described above. According to the depicted embodiment, a locking mechanism 470 is provided that is comprised of a cap-nut 475. The cap-nut 475 is adapted for engaging the portion of wheel mount bolt 419 that extends through the bearing assembly 340 (see FIG. 9B). The cap-nut 475 is provided in place of at least one of the above-described lug nuts (not shown). The cap-nut 475 engages a wheel mount bolt 419 through a conventional access hole 436 of the type described above. In one embodiment, the cap-nut 475 is longer than conventional lug nuts and thus, may be seated within the access hole to restrict rotational movement of the wheel spinner 430. FIG. 10A also illustrates rim 422, openings 433, recesses 434, axis of rotation 441, and slots 446.

In one embodiment, the cap-nut 475 includes a flange portion 476 and a hozzle portion 477 as shown in FIG. 10B. The hozzle portion 477 is threaded and configured to engage a conventional wheel mount bolt 419. The hozzle 477 has a sufficient length to reach a wheel mount bolt 419 through a conventional access hole 436. As referenced above, an access hole 436 is typically provided in the exterior surface of conventional wheel spinners in order to provide a technician with access to the wheel mounting lug nuts (not shown). Preferably, the hozzle 477 of the cap-nut 475 has a sufficient diameter to substantially snugly engage the outer perimeter of the access hole 436 as shown.

In one embodiment, the flange 476 is provided as a tactile gripping device for a user and to prevent the cap-nut 475 from receding entirely within the access hole 436. Accordingly, upon installation the cap-nut 475 prevents rotation of the wheel spinner 430 relative to the wheel (not shown).

Figure 11:
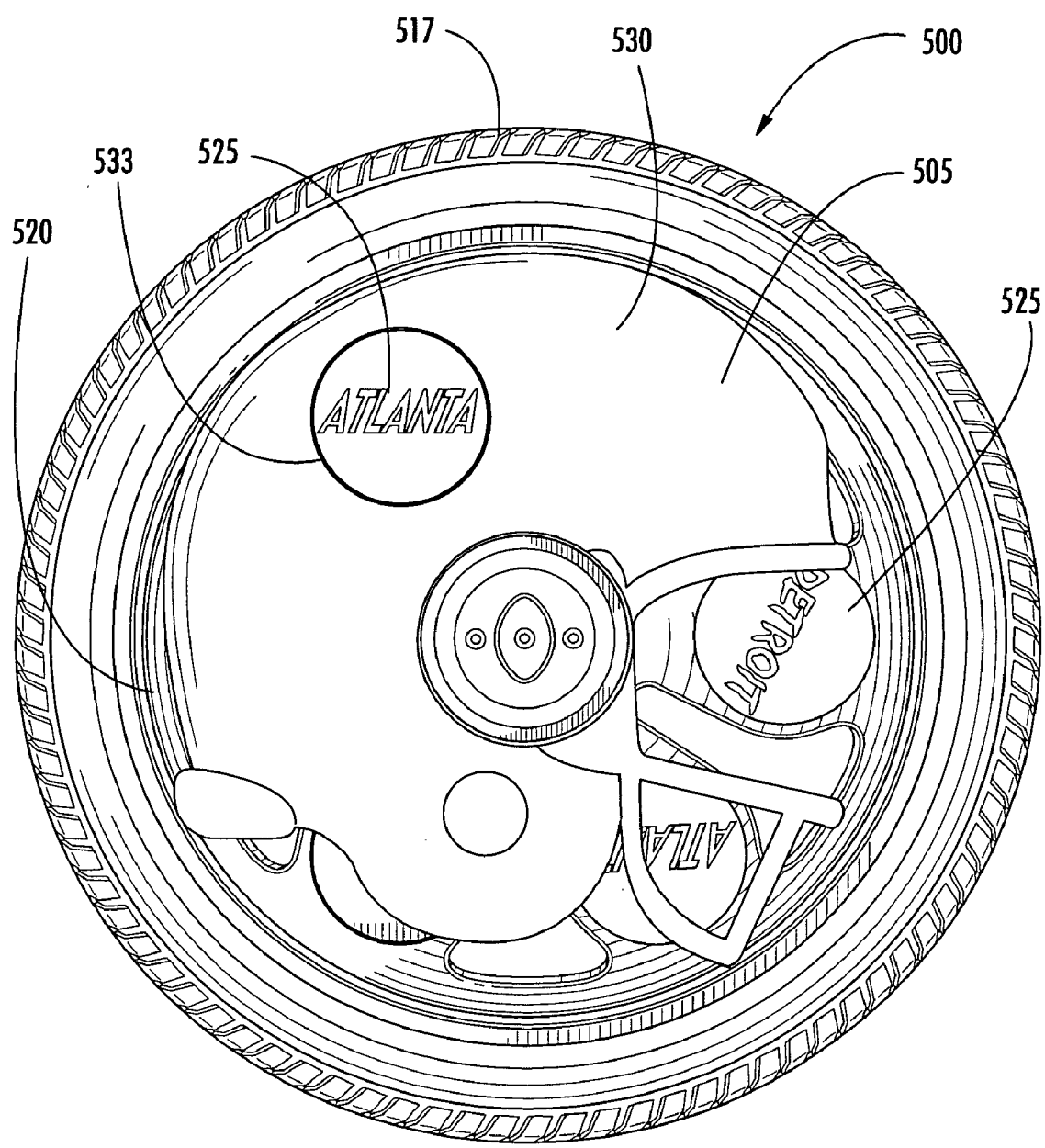
FIG. 11 is a front view of a football-helmet themed wheel assembly according to one embodiment of the invention.
Figure 13:
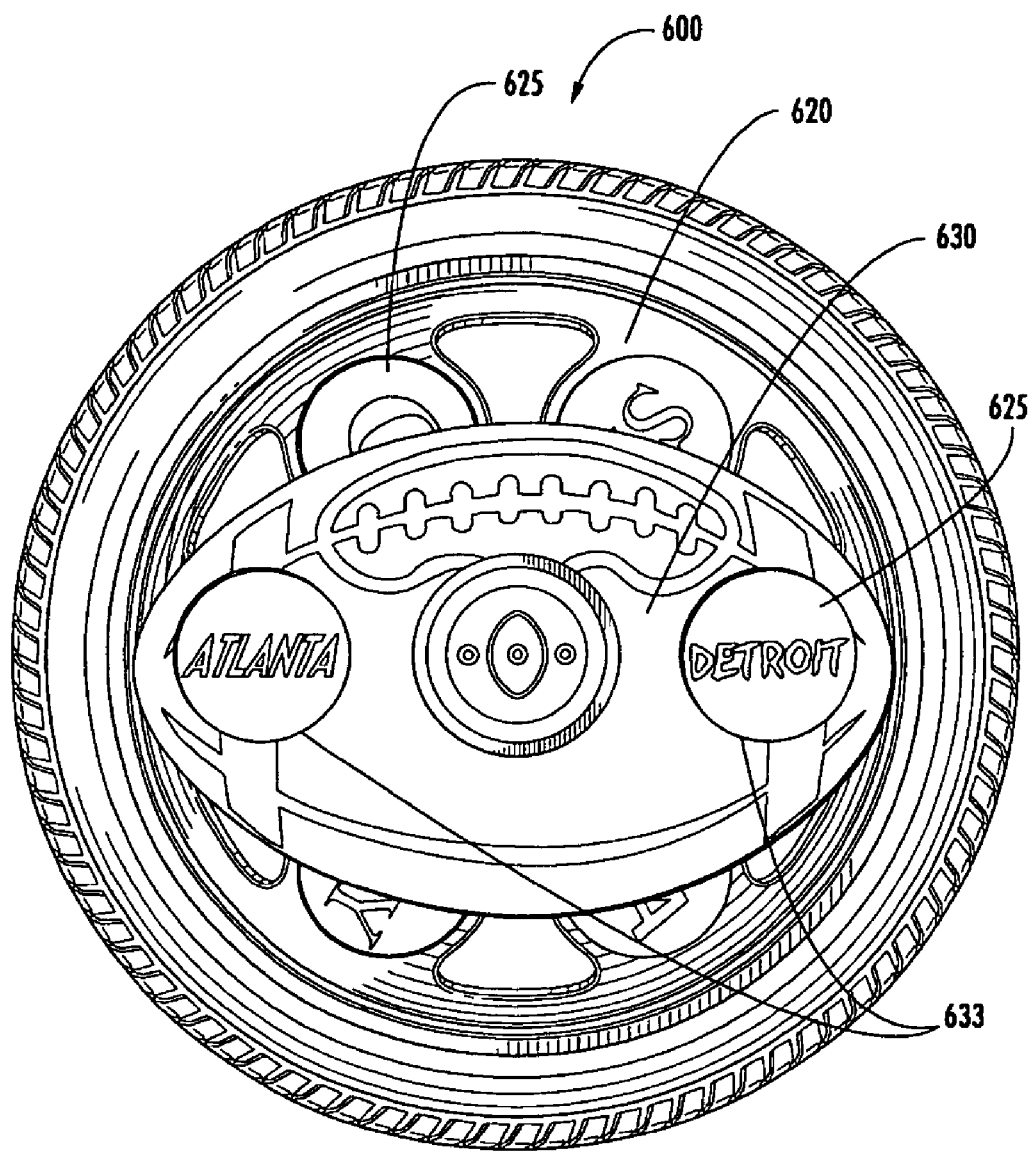
FIG. 13 is a front view of a football themed wheel assembly according to one embodiment of the invention.
Figure 14:
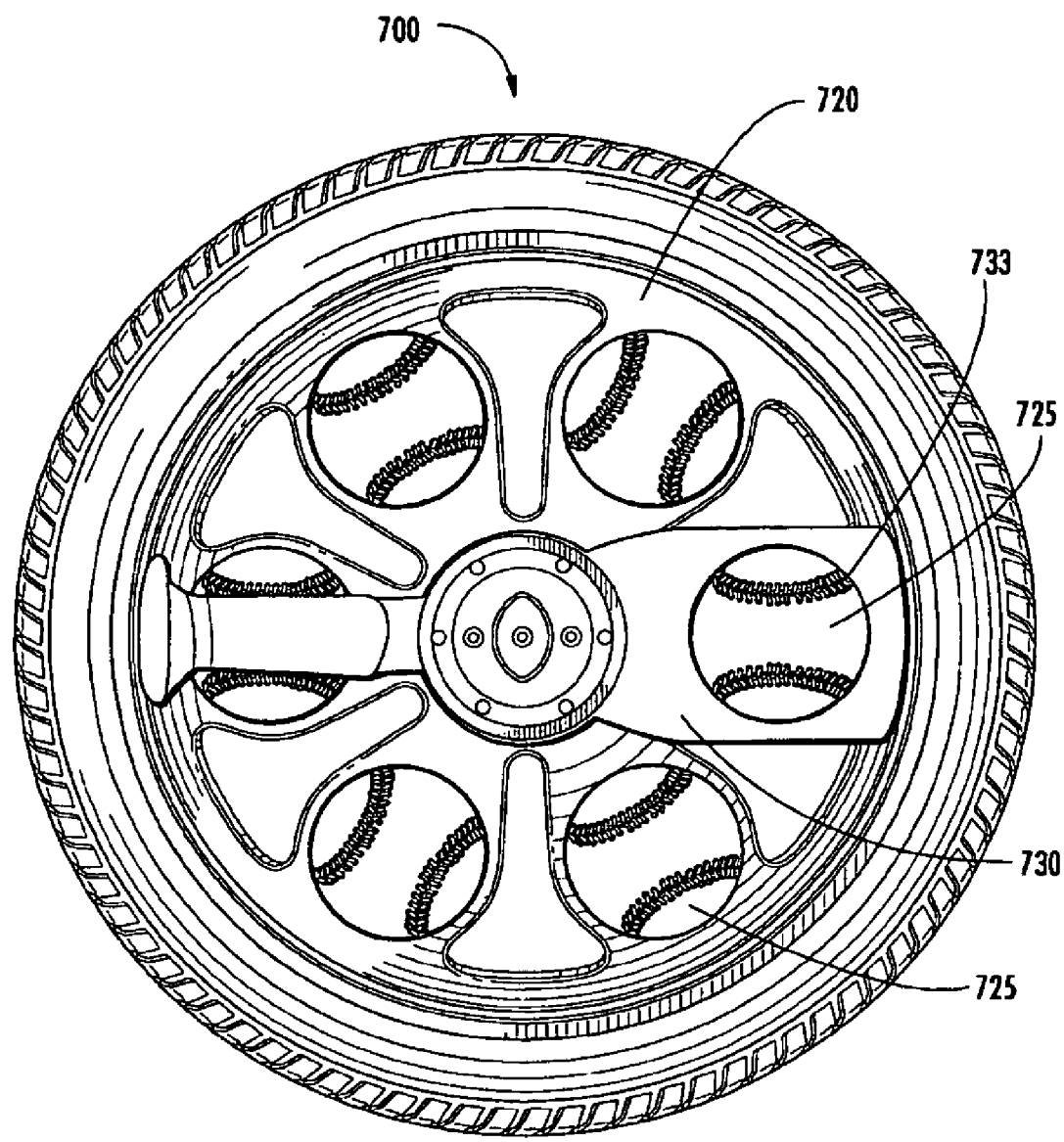
FIG. 14 is a front view of a baseball themed wheel assembly according to one embodiment of the invention.

FIGS. 11, 13 and 14 illustrate various other themed wheel assemblies 500, 600, 700 in accordance with the invention. For example, various sports themes are provided wherein the wheel spinner 530, 630, 730 is configured to resemble a football helmet, a football and a baseball bat respectively. As referenced above, various embodiments of the present invention include wheels 520, 620, 720 having a plurality of visual elements 525, 625, 725 (e.g., team logos, baseballs, etc.) disposed adjacent the exterior surface of the wheel 520, 620, 720. In one embodiment, as illustrated in FIG. 11, the wheel spinner 530 may be configured to resemble a football helmet having an opening 533 defined in a helmet portion 505. Accordingly, the opening 533 defines a viewing area for viewing the plurality of visual elements 525 mounted to rotate adjacent the wheel 520. In the depicted embodiment, the visual elements 525 are team logos that individually align with the spinner opening 533 in various predetermined angular orientations.

Accordingly, a multiple team football helmet effect may be produced for viewers of the football helmet-themed wheel assembly 500 at relatively low speeds. FIG. 11 also illustrates tire 517.

In another embodiment, a similar effect may be achieved using a football wheel spinner 630 as shown in FIG. 13. In this embodiment, however, the football shaped wheel spinner 630 defines two openings 633 for aligning with the visual elements 625 of the wheel 620 at various predetermined angular orientations. In another embodiment, as illustrated in FIG. 14, a baseball bat wheel spinner 730 may be provided that defines one or more openings 733 for viewing a plurality of baseball-related visual elements 725 mounted adjacent the exterior surface of a wheel 720. In various other embodiments of the present invention, other similar themes as known to one of ordinary skill in the art (e.g., a roulette theme, a poker or playing card theme, etc.) may be created, such that visual effect produced is one not typically associated with vehicle wheels, and gives the wheel/wheel spinner combination the appearance of an object other than a wheel-related object.

Figure 12:
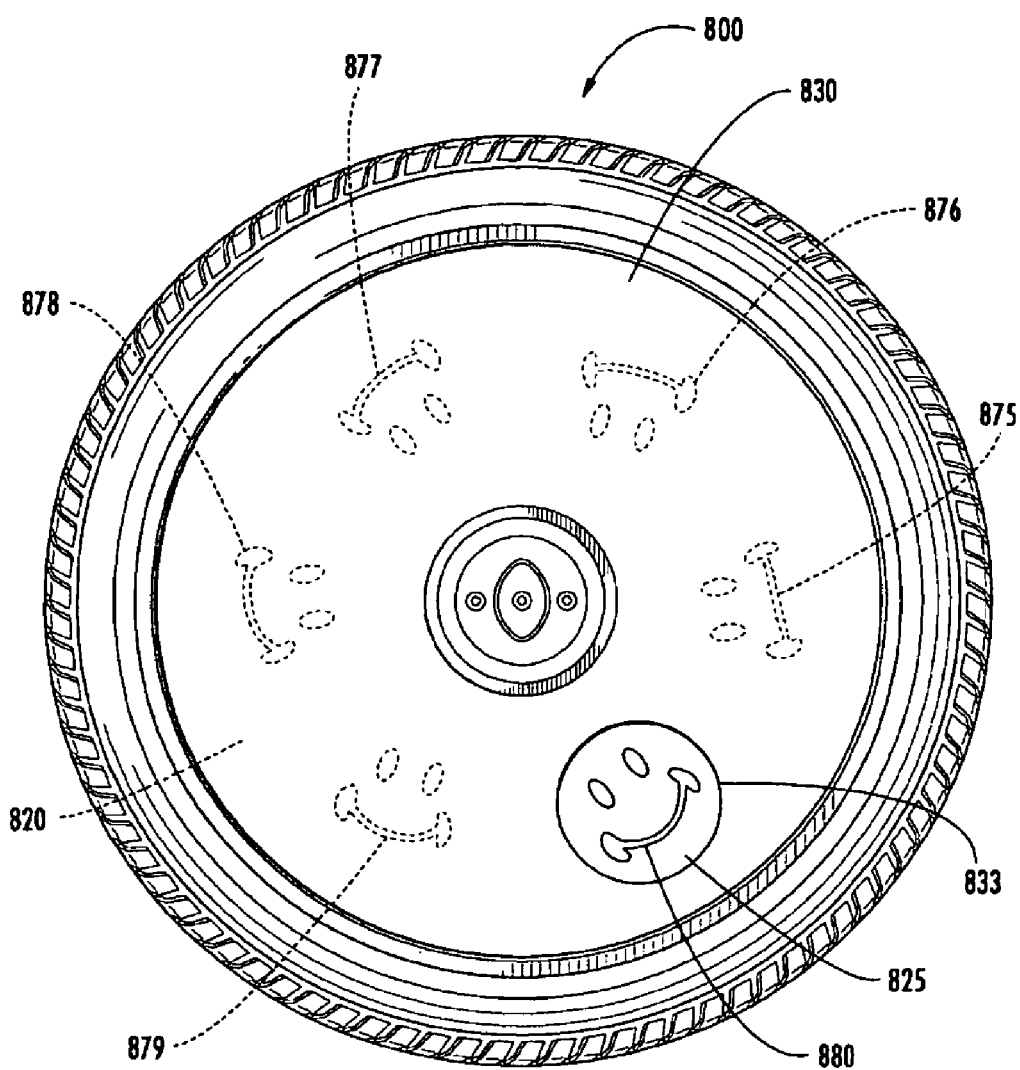
FIG. 12 is a front view of a stop-motion themed wheel assembly according to one embodiment of the invention.

In another embodiment, a stop-motion animation theme may be provided as illustrated in FIG. 12. According to this embodiment, the second member 830 of the stop-motion wheel assembly 800 is not necessarily a "wheel spinner" as described above and is, in fact, configured to maintain a fixed radial orientation despite relative rotation of an adjacent wheel 820. The second member 830 includes an opening 833 for viewing various stop-motion themed elements 825 that are disposed adjacent the exterior surface of the wheel 820 as shown. The fixed radial orientation of the second member 830 causes the opening 833 defined therein to appear stationary (i.e., resist spinning relative to the wheel) when viewed by an observer.

Similar to the visual elements described above, a plurality of stop-motion elements 825 (depicted in FIG. 12 as smiley faces) are disposed adjacent the exterior surface of a wheel 820. The elements 825 are configured to rotate past the "window" provided by the opening 833 defined by the second member 830. In one embodiment, the visual elements 825 (e.g., graphics, figures, etc.) may be slightly altered relative to one another such that as they move past the window (i.e., opening 833) provided by the second member 830, the elements proved an illusion of motion. In particular, the movement of the stop-motion elements 825 past the window appears to an observer as if a single stop-motion element is moving. In the depicted embodiment, a smiley face element 825 is provided that illustrates various stages of a smile 875, 876, 877, 878, 879, 880. Accordingly, as the various smiley face elements 825 rotate in a clock-wise direction past the opening 833 a smile movement is simulated.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A wheel assembly, comprising:
   a first rotating member having an exterior surface;
   a visual element disposed adjacent said exterior surface of said first rotating member, said visual element having an outer perimeter; and
   a second member mounted to rotate adjacent said first rotating member, said second member defining an opening having an outer perimeter, wherein said first rotating member and said second member are adapted to be moved between:
   a first position in which said outer perimeter of said opening does not align with said outer perimeter of said visual element; and
   a home position wherein said outer perimeter of said opening is aligned with said outer perimeter of said visual element.

2. The wheel assembly of claim 1, wherein said first rotating member is a wheel.

3. The wheel assembly of claim 2, wherein said second member is a wheel spinner.

4. The wheel assembly of claim 1, wherein said second member is a wheel spinner.

5. The wheel assembly of claim 1, wherein said first rotating member is a substantially planar element configured to engage a wheel such that said first rotating member and said wheel rotate in unison.

6. The wheel assembly of claim 1, wherein said first rotating member is a substantially planar element that is mounted on, a bearing, to rotate adjacent a wheel.

7. The wheel assembly of claim 6, wherein said first rotating member is configured to maintain a substantially fixed radial orientation despite relative rotation of said wheel.

8. The wheel assembly of claim 1, wherein:
   said visual element is a first visual element, and
   said wheel assembly further comprises a second visual element disposed adjacent said exterior surface of said first rotating member, said second visual element having an outer perimeter.

9. The wheel assembly of claim 8, wherein:
   said opening is a first opening and said first outer perimeter of said first opening and said first outer perimeter of said first visual element are a same shape,
   said second member further defines a second opening having a second outer perimeter, and
   said first outer perimeter of said first opening aligns with said first outer perimeter of said first visual element, and said second outer perimeter of said second opening aligns with said second outer perimeter of said second visual element in said home position.

10. The wheel assembly of claim 1, wherein said visual element of said first rotating member includes themed indicia.

11. The wheel assembly of claim 1, wherein said first rotating member and said second member are mounted to rotate about a common axis.

12. The wheel assembly of claim 1, wherein said second member is mounted on a bearing to rotate relative to said first rotating member.

13. The wheel assembly of claim 1, wherein said second member is configured to rotate in unison with said first rotating member.

14. The wheel assembly of claim 1, further comprising an aligning mechanism for maintaining said second member in said home position relative to said first rotating member.

15. The wheel assembly of claim 14, wherein:
   said aligning mechanism is configured to reduce the rotational speed of said second member thereby facilitating movement of said second member to said home position relative to said first rotating member.

16. The wheel assembly of claim 1, wherein said second member is configured to maintain a substantially fixed radial orientation despite relative rotation of said first rotating member.

17. The wheel assembly of claim 1, wherein said first rotating member is weighted so that said first rotating member moves into said home position when said first member substantially stops rotating.

18. The wheel assembly of claim 17, wherein said second member is weighted so that said second member moves into said home position when said second member substantially stops rotating.

19. The wheel assembly of claim 1, wherein said second member is weighted so that said second member moves into said home position when said second member substantially stops rotating.

20. The wheel assembly of claim 1, wherein said second member is configured to complement said visual element of said first rotating member thereby defining a themed appearance.

21. The wheel assembly of claim 1, wherein said second member includes a complementary visual element adapted to complement the appearance of said visual element of said first rotating member.

22. The wheel assembly of claim 21, wherein said complementary visual element is positioned centrally adjacent said second member.

23. A themed wheel assembly, comprising:
   a wheel having an exterior surface; a themed element having a perimeter, wherein said themed element is disposed adjacent said exterior surface of said wheel;

a rotating member that is mounted to rotate adjacent said wheel, said rotating member being adapted to possess a themed appearance and further defining an opening having a perimeter, wherein said wheel and said rotating member are adapted to be moved between:
a first position wherein said perimeter of said opening does not align with said perimeter of said themed element; and
a home position wherein said perimeter of said opening is aligned with said perimeter of said themed element.

24. The themed wheel assembly of claim 23, wherein:
said themed element is a first themed element having a first perimeter, and
said themed wheel assembly further comprises a second themed element having a second perimeter disposed adjacent said exterior surface of said wheel.

25. The wheel assembly of claim 24, wherein:
said opening is a first opening having a first perimeter, said rotating member further defines a second opening having a second perimeter, and
when said wheel and said rotating member are in said home position, said second perimeter of said second opening aligns with said second perimeter of said second themed element.

26. The themed wheel assembly of claim 25, wherein:
said themed wheel assembly is adapted to resemble a loaded revolver-cylinder when said wheel and said rotating member are in said home position.

27. The themed wheel assembly of claim 23, wherein said themed element is configured to resemble a firing end of a bullet.

28. The themed wheel assembly of claim 23, wherein said wheel and said rotating member are mounted to rotate about a common axis.

29. The themed wheel assembly of claim 23, wherein said rotating member is rotatably mounted on a bearing to rotate adjacent said wheel.

30. The themed wheel assembly of claim 23, wherein said rotating member is configured to rotate in unison with said wheel.

31. The themed wheel assembly of claim 23, further comprising an aligning mechanism affixed to said rotating member for maintaining said rotating member in said home position relative to said wheel.

32. The themed wheel assembly of claim 23, wherein said rotating member is configured to maintain a fixed radial orientation despite a relative rotation of said wheel.

33. The themed wheel assembly of claim 23, wherein said rotating member includes a complementary themed element provided to complement the appearance of said visual element of said wheel.

34. The themed wheel assembly of claim 33, wherein said complementary themed element is positioned coaxially adjacent said rotating member.

35. A wheel assembly, comprising:
a wheel including an outer rim, an exterior surface, and a plurality of visual elements provided in a pattern adjacent said exterior surface between said centrally disposed mounting area and said outer rim, said plurality of visual elements being radially aligned and uniformly distributed adjacent said wheel;
a wheel spinner mounted to rotate relative to said wheel and further defining a plurality of openings configured to mirror the pattern of said plurality of visual elements of said wheel; and
wherein said wheel and said wheel spinner are adapted to be rotated between:

a first position in which said plurality of openings do not align with said plurality of visual elements, and
a home position in which said plurality of openings are aligned with said plurality of visual elements.

36. The wheel assembly of claim 35, wherein:
said plurality of visual elements comprises a first visual element and a second visual element.

37. The wheel assembly of claim 36, wherein:
said plurality of openings comprises first opening and a second opening; and
when said wheel and said wheel spinner are in said home position, said second opening of said wheel spinner aligns with said second visual element of said wheel.

38. The wheel assembly of claim 35, wherein at least one of said plurality of visual elements is configured to resemble a firing end of a bullet.

39. The wheel assembly of claim 35, wherein said plurality of visual elements of said wheel includes themed indicia.

40. The wheel assembly of claim 35, wherein said wheel and said wheel spinner are mounted to rotate about a common axis.

41. The wheel assembly of claim 35, wherein said wheel spinner is mounted on a bearing to rotate relative to said wheel.

42. The wheel assembly of claim 35, wherein said wheel spinner is configured to rotate m unison with said wheel.

43. The wheel assembly of claim 35, further comprising an aligning mechanism for maintaining said wheel spinner in said home position.

44. The wheel assembly of claim 35, wherein said aligning mechanism comprises an electromagnet.

45. The wheel assembly of claim 35, wherein said wheel spinner includes a rotating axis and is weighted such that said wheel spinner moves into said home position in a substantially automatic manner when said wheel spinner substantially stops rotating.

46. The wheel assembly of claim 35, wherein said wheel spinner includes a themed shape that is configured to complement said plurality of visual elements of said wheel thereby defining a themed appearance.

47. The wheel assembly of claim 35, wherein said wheel spinner includes a complementary visual element adapted to complement said plurality of visual elements of said wheel.

48. The wheel assembly of claim 47, wherein said complementary visual element is positioned centrally adjacent said wheel spinner.

49. A revolver-themed wheel assembly, comprising:
a wheel having an exterior surface;
a bullet indicia disposed adjacent said exterior surface of said wheel; and
a second member mounted to rotate adjacent said wheel, said second member configured to resemble a revolver-cylinder by defining an opening having an outer perimeter, wherein said wheel and said second member are adapted to be moved between:
a first position in which said outer perimeter of said opening is not aligned with said bullet indicia; and
a home position in which said outer perimeter of said opening is aligned with said bullet indicia, thereby resembling a loaded revolver-cylinder.

50. The revolver-themed wheel assembly of claim 49, wherein said bullet indicia includes first and second bullet indicia.

51. The revolver-themed wheel assembly of claim 49, wherein:
said bullet indicia is a first bullet indicia, and said revolver-themed wheel assembly further comprises second and third bullet indicia disposed adjacent said exterior surface of said wheel.

52. The revolver wheel assembly of claim 49, wherein:
said bullet indicia is a first bullet indicia, and
said revolver wheel assembly further comprises second, third, fourth, and fifth bullet indicia disposed adjacent said exterior surface of said wheel.

53. The revolver wheel assembly of claim 49, wherein:
said opening is a first opening, and
said second member further defines a second opening.

54. The revolver wheel assembly of claim 49, wherein:
said opening is a first opening, and
said second member further defines second and third openings.

55. The revolver wheel assembly of claim 49, wherein:
said opening is a first opening, and
said second member further defines second, third, fourth, fifth and sixth openings.

56. The revolver wheel assembly of claim 49, wherein said wheel and said second member are mounted to rotate about a common axis.

57. The revolver wheel assembly of claim 49, wherein said second member is mounted on a bearing to rotate relative to said wheel.

58. The revolver wheel assembly of claim 49, wherein said second member is configured to rotate in unison with said wheel.

59. The revolver wheel assembly of claim 49, further comprising an aligning mechanism for orienting said second member into said home position relative to said wheel.

60. The revolver wheel assembly of claim 49, wherein said aligning mechanism comprises an electromagnet.

61. The revolver wheel assembly of claim 49, wherein said second member includes a rotating axis and a weighted portion for moving said second member into said home position when said second member substantially stops rotating.

62. The revolver wheel assembly of claim 49, wherein said second member has a substantially circular shape and defines a plurality of substantially semi-circular recesses about a circumference of the second member.

63. A self-aligning wheel assembly, comprising:
a first rotating member having an exterior surface;
a visual element disposed adjacent said exterior surface of said first rotating member;
a second member mounted to rotate adjacent said first rotating member; said second member defining an opening having an outer perimeter; and
an aligning mechanism for selectively orienting said second member in a home position relative to said first rotating member.

64. The self-aligning wheel assembly of claim 63, wherein:
said aligning mechanism is configured for moving said second member relative to said first rotating member between:
a first position wherein said outer perimeter of said opening does not substantially align with said outer perimeter of said visual element, and
a home position wherein said outer perimeter of said opening is substantially aligned with said outer perimeter of said visual element.

65. The self-aligning wheel assembly of claim 63, wherein said first rotating member includes a rotating axis and wherein said aligning mechanism includes a first weighted portion affixed to said first rotating member such that said first rotating member moves into said home position when said first member substantially stops rotating.

66. The self-aligning wheel assembly of claim 63, wherein said aligning mechanism comprises an electromechanical brake.

67. The self-aligning wheel assembly of claim 63, wherein said aligning mechanism includes a lock for releasably coupling said second member to said first rotating member in said home position such that second member rotates in unison with said first rotating member.

* * * * *